US008707209B2

(12) United States Patent (10) Patent No.: US 8,707,209 B2
Wong et al. (45) Date of Patent: Apr. 22, 2014

(54) SAVE PREVIEW REPRESENTATION OF FILES BEING CREATED

(75) Inventors: Lyon K. F. Wong, Issaquah, WA (US); Cornelis K. Van Dok, Tübingen (DE); David G. DeVorchik, Seattle, WA (US); Matthew MacLaurin, Woodinville, WA (US); Patrice L. Miner, Kirkland, WA (US); Walter R. Smith, Seattle, WA (US); Philip P. Fortier, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1014 days.

(21) Appl. No.: 11/568,447

(22) PCT Filed: Apr. 22, 2005

(86) PCT No.: PCT/US2005/013589
§ 371 (c)(1),
(2), (4) Date: Dec. 26, 2007

(87) PCT Pub. No.: WO2005/111784
PCT Pub. Date: Nov. 24, 2005

(65) Prior Publication Data
US 2008/0222547 A1 Sep. 11, 2008

Related U.S. Application Data

(63) Continuation-in-part of application No. 10/950,075, filed on Sep. 24, 2004, now Pat. No. 7,421,438.

(60) Provisional application No. 60/566,502, filed on Apr. 29, 2004.

(51) Int. Cl.
*G06K 3/00* (2006.01)

(52) U.S. Cl.
USPC .......................................... 715/826; 715/769

(58) Field of Classification Search
USPC ......... 715/769, 847, 854–855, 967, 970, 802, 715/805, 771–773; 707/705, 741, 781, 790
See application file for complete search history.

(56) References Cited

U.S. PATENT DOCUMENTS 4,214,141 A 7/1980 Okuda et al.
4,438,505 A 3/1984 Yanagiuchi
(Continued)

FOREIGN PATENT DOCUMENTS

CN 1239239 A 12/1999
CN 1421800 6/2003
(Continued)

OTHER PUBLICATIONS

Domoto, Kenji et al., "The Power of Fast Full Text Search," Nikkei Byte, No. 156, pp. 142-167, Nikkei Business Publications, Inc., Japan, Sep. 22, 1996 (Previously delivered.).

(Continued)

*Primary Examiner* — Steven Sax
(74) *Attorney, Agent, or Firm* — Sung Kim; Leonard Smith; Micky Minhas

(57) ABSTRACT

In a graphical user interface environment, a request to save a file may result in a display of a location or view in which the file is to be saved, and may include a preview indicia representing the to-be-saved file. The user may interact with the preview indicia to edit the new file's metadata by repositioning the indicia in a different view, and/or the system may automatically update the preview indicia's location in response to the user editing displayed metadata properties for the new file. The preview indicia may have a distinct appearance, and may persist to show the user how the new file can be located after the save process is performed.

15 Claims, 7 Drawing Sheets

(56) References Cited

U.S. PATENT DOCUMENTS

| | | | |
|---|---|---|---|
| 4,829,423 A | 5/1989 | Tennant et al. | |
| 4,881,179 A | 11/1989 | Vincent | |
| 4,931,935 A | 6/1990 | Ohira et al. | |
| 5,060,135 A | 10/1991 | Levine et al. | |
| 5,065,347 A | 11/1991 | Pajak et al. | |
| 5,241,671 A | 8/1993 | Reed et al. | |
| 5,297,250 A | 3/1994 | Leroy et al. | |
| 5,327,529 A | 7/1994 | Fults | |
| 5,333,266 A | 7/1994 | Boaz et al. | |
| 5,333,315 A | 7/1994 | Saether | |
| 5,388,196 A | 2/1995 | Pajak | |
| 5,420,605 A | 5/1995 | Vouri | |
| 5,461,710 A | 10/1995 | Bloomfield | |
| 5,499,364 A | 3/1996 | Klein | |
| 5,504,852 A | 4/1996 | Thompson-Rohrlich | |
| 5,513,306 A | 4/1996 | Mills | |
| 5,544,360 A | 8/1996 | Lewak et al. | |
| 5,546,527 A | 8/1996 | Fitzpatrick et al. | |
| 5,550,852 A | 8/1996 | Patel et al. | |
| 5,559,948 A | 9/1996 | Bloomfield et al. | |
| 5,583,982 A | 12/1996 | Matheny et al. | |
| 5,590,259 A | 12/1996 | Anderson et al. | |
| 5,596,702 A | 1/1997 | Stucka | |
| 5,598,524 A | 1/1997 | Johnston et al. | |
| 5,600,778 A | 2/1997 | Swanson et al. | |
| 5,606,669 A | 2/1997 | Bertin et al. | |
| 5,625,783 A | 4/1997 | Ezekiel | |
| 5,630,042 A | 5/1997 | McIntosh et al. | |
| 5,648,795 A | 7/1997 | Vouri | |
| 5,652,876 A | 7/1997 | Ashe | |
| 5,675,520 A | 10/1997 | Pitt | |
| 5,680,563 A | 10/1997 | Edelman | |
| 5,696,486 A | 12/1997 | Poliquin | |
| 5,696,914 A | 12/1997 | Nahaboo | |
| 5,710,926 A | 1/1998 | Maurer | |
| 5,721,908 A | 2/1998 | Lagarde et al. | |
| 5,757,925 A | 5/1998 | Faybishenko | |
| 5,760,770 A | 6/1998 | Bliss | |
| 5,787,413 A | 7/1998 | Kauffman et al. | |
| 5,790,121 A | 8/1998 | Sklar | |
| 5,802,516 A | 9/1998 | Shwarts et al. | |
| 5,828,376 A | 10/1998 | Solimene et al. | |
| 5,831,606 A | 11/1998 | Nakajima et al. | |
| 5,835,094 A | 11/1998 | Ermel et al. | |
| 5,838,317 A | 11/1998 | Bolnick et al. | |
| 5,838,322 A | 11/1998 | Nakajima et al. | |
| 5,842,020 A | 11/1998 | Faustini | |
| 5,844,554 A | 12/1998 | Geller et al. | |
| 5,855,446 A | 1/1999 | Disborg | |
| 5,867,163 A | 2/1999 | Kurtenbach | |
| 5,870,088 A * | 2/1999 | Washington et al. | 715/781 |
| 5,875,446 A | 2/1999 | Brown et al. | |
| 5,875,448 A | 2/1999 | Boys | |
| 5,878,410 A | 3/1999 | Zbikowski et al. | |
| 5,886,694 A | 3/1999 | Breinberg et al. | |
| 5,907,703 A | 5/1999 | Kronenberg | |
| 5,907,837 A | 5/1999 | Ferrel et al. | |
| 5,909,540 A | 6/1999 | Carter et al. | |
| 5,917,492 A | 6/1999 | Bereiter | |
| 5,923,328 A | 7/1999 | Griesmer | |
| 5,929,854 A | 7/1999 | Ross | |
| 5,930,801 A | 7/1999 | Falkenhainer | |
| 5,933,139 A | 8/1999 | Feigner | |
| 5,935,210 A | 8/1999 | Stark | |
| 5,973,686 A | 10/1999 | Shimogori | |
| 5,987,454 A | 11/1999 | Hobbs | |
| 5,987,506 A | 11/1999 | Carter et al. | |
| 6,003,040 A | 12/1999 | Mital | |
| 6,008,806 A | 12/1999 | Nakajima et al. | |
| 6,014,137 A | 1/2000 | Burns | |
| 6,016,692 A | 1/2000 | Schaenzer et al. | |
| 6,021,262 A | 2/2000 | Cote | |
| 6,023,708 A | 2/2000 | Mendez | |
| 6,024,843 A | 2/2000 | Anderson | |
| 6,025,843 A | 2/2000 | Sklar | |
| 6,037,944 A | 3/2000 | Hugh | |
| 6,055,540 A | 4/2000 | Snow | |
| 6,055,543 A | 4/2000 | Christensen et al. | |
| 6,061,059 A | 5/2000 | Taylor | |
| 6,061,692 A | 5/2000 | Thomas et al. | |
| 6,061,695 A | 5/2000 | Slivka et al. | |
| 6,065,012 A | 5/2000 | Balsara et al. | |
| 6,078,924 A | 6/2000 | Ainsbury et al. | |
| 6,097,389 A | 8/2000 | Morris et al. | |
| 6,101,509 A | 8/2000 | Hanson | |
| 6,144,968 A | 11/2000 | Zellweger | |
| 6,147,601 A | 11/2000 | Sandelman | |
| 6,160,552 A | 12/2000 | Wilsher | |
| 6,175,364 B1 | 1/2001 | Wong et al. | |
| 6,181,342 B1 | 1/2001 | Niblack | |
| 6,195,650 B1 | 2/2001 | Gaither et al. | |
| 6,202,061 B1 | 3/2001 | Khosla et al. | |
| 6,216,122 B1 | 4/2001 | Elson | |
| 6,237,004 B1 | 5/2001 | Dodson et al. | |
| 6,237,011 B1 | 5/2001 | Ferguson et al. | |
| 6,240,407 B1 | 5/2001 | Chang et al. | |
| 6,240,421 B1 | 5/2001 | Stolarz | |
| 6,243,094 B1 | 6/2001 | Sklar | |
| 6,243,724 B1 | 6/2001 | Mander et al. | |
| 6,246,411 B1 | 6/2001 | Strauss | |
| 6,247,020 B1 | 6/2001 | Minard | |
| 6,256,031 B1 | 7/2001 | Meijer et al. | |
| 6,268,852 B1 | 7/2001 | Lindhorst et al. | |
| 6,271,846 B1 | 8/2001 | Martinez et al. | |
| 6,275,829 B1 | 8/2001 | Angiulo | |
| 6,279,016 B1 | 8/2001 | De Vorchik et al. | |
| 6,301,586 B1 | 10/2001 | Yang et al. | |
| 6,308,173 B1 | 10/2001 | Glasser et al. | |
| 6,317,142 B1 | 11/2001 | Decoste et al. | |
| 6,317,777 B1 | 11/2001 | Skarbo et al. | |
| 6,324,541 B1 | 11/2001 | de l'Etraz et al. | |
| 6,324,551 B1 | 11/2001 | Lamping et al. | |
| 6,326,953 B1 | 12/2001 | Wana | |
| 6,330,007 B1 | 12/2001 | Isreal | |
| 6,339,767 B1 | 1/2002 | Smith | |
| 6,341,280 B1 | 1/2002 | Glass | |
| 6,342,907 B1 | 1/2002 | Petty | |
| 6,356,863 B1 | 3/2002 | Sayle | |
| 6,356,908 B1 | 3/2002 | Brown et al. | |
| 6,356,915 B1 | 3/2002 | Chtchetkine et al. | |
| 6,363,377 B1 | 3/2002 | Kravets et al. | |
| 6,363,400 B1 | 3/2002 | Chtchetkine et al. | |
| 6,369,840 B1 | 4/2002 | Barnett et al. | |
| 6,370,518 B1 | 4/2002 | Payne et al. | |
| 6,374,260 B1 * | 4/2002 | Hoffert et al. | 1/1 |
| 6,377,283 B1 | 4/2002 | Thomas | |
| 6,385,641 B1 | 5/2002 | Jiang et al. | |
| 6,393,429 B1 | 5/2002 | Yagi et al. | |
| 6,401,097 B1 | 6/2002 | McCotter | |
| 6,405,265 B1 | 6/2002 | Kronenberg | |
| 6,408,298 B1 | 6/2002 | Van | |
| 6,411,311 B1 | 6/2002 | Rich | |
| 6,425,120 B1 | 7/2002 | Morganelli et al. | |
| 6,425,121 B1 | 7/2002 | Phillips | |
| 6,430,575 B1 | 8/2002 | Dourish et al. | |
| 6,430,835 B1 | 8/2002 | Ranucci et al. | |
| 6,437,807 B1 | 8/2002 | Berquist et al. | |
| 6,438,590 B1 | 8/2002 | Gartner | |
| 6,448,985 B1 | 9/2002 | McNally | |
| 6,453,311 B1 | 9/2002 | Powers, III | |
| 6,453,319 B1 | 9/2002 | Mattis et al. | |
| 6,462,762 B1 | 10/2002 | Ku | |
| 6,466,228 B1 | 10/2002 | Ulrich | |
| 6,466,238 B1 | 10/2002 | Berry et al. | |
| 6,466,932 B1 | 10/2002 | Dennis et al. | |
| 6,470,344 B1 | 10/2002 | Kothuri et al. | |
| 6,473,100 B1 | 10/2002 | Beaumont et al. | |
| 6,480,835 B1 | 11/2002 | Light | |
| 6,483,525 B1 | 11/2002 | Tange | |
| 6,484,189 B1 | 11/2002 | Gerlach, Jr. et al. | |
| 6,484,205 B1 | 11/2002 | Byford | |
| 6,496,837 B1 | 12/2002 | Howard et al. | |
| 6,505,233 B1 | 1/2003 | Hanson et al. | |
| 6,513,038 B1 | 1/2003 | Hasegawa et al. | |

(56) References Cited

U.S. PATENT DOCUMENTS

| | | |
|---|---|---|
| 6,519,612 B1 | 2/2003 | Howard et al. |
| 6,526,399 B1 | 2/2003 | Coulson et al. |
| 6,535,229 B1 | 3/2003 | Kraft |
| 6,535,230 B1 | 3/2003 | Celik |
| 6,539,399 B1 | 3/2003 | Hazama et al. |
| 6,544,295 B1 | 4/2003 | Bodnar |
| 6,549,217 B1 | 4/2003 | De Greef |
| 6,549,916 B1 | 4/2003 | Sedlar |
| 6,563,514 B1 | 5/2003 | Samar |
| 6,571,245 B2 | 5/2003 | Huang et al. |
| 6,573,906 B1 | 6/2003 | Harding et al. |
| 6,573,907 B1 | 6/2003 | Madrane |
| 6,583,799 B1 | 6/2003 | Manolis et al. |
| 6,590,585 B1 | 7/2003 | Suzuki et al. |
| 6,606,105 B1 | 8/2003 | Quartetti |
| 6,613,101 B2 | 9/2003 | Mander et al. |
| 6,628,309 B1 | 9/2003 | Dodson |
| 6,636,238 B1 | 10/2003 | Amir et al. |
| 6,636,250 B1 | 10/2003 | Gasser |
| 6,638,313 B1 | 10/2003 | Freeman |
| 6,658,406 B1 | 12/2003 | Mazner et al. |
| 6,662,198 B2 | 12/2003 | Satyanarayanan |
| 6,684,222 B1 | 1/2004 | Cornelius et al. |
| 6,721,760 B1 | 4/2004 | Ono |
| 6,725,227 B1 | 4/2004 | Li |
| 6,735,623 B1 | 5/2004 | Prust |
| 6,738,770 B2 | 5/2004 | Gorman |
| 6,745,206 B2 | 6/2004 | Mandler et al. |
| 6,745,207 B2 | 6/2004 | Reuter et al. |
| 6,751,626 B2 | 6/2004 | Brown et al. |
| 6,754,829 B1 | 6/2004 | Butt et al. |
| 6,760,721 B1 | 7/2004 | Chasen |
| 6,762,776 B2 | 7/2004 | Huapaya |
| 6,762,777 B2 | 7/2004 | Carroll |
| 6,763,458 B1 | 7/2004 | Watanabe et al. |
| 6,763,777 B1 | 7/2004 | Rosenberg |
| 6,768,999 B2 | 7/2004 | Prager |
| 6,784,900 B1 | 8/2004 | Dobronsky |
| 6,784,925 B1 | 8/2004 | Tomat et al. |
| 6,795,094 B1 | 9/2004 | Watanabe |
| 6,801,909 B2 | 10/2004 | Delgado et al. |
| 6,801,919 B2 | 10/2004 | Hunt |
| 6,803,926 B1 | 10/2004 | Lamb |
| 6,813,474 B2 | 11/2004 | Robinson et al. |
| 6,816,863 B2 | 11/2004 | Bates |
| 6,820,083 B1 | 11/2004 | Nagy et al. |
| 6,823,344 B1 | 11/2004 | Isensee et al. |
| 6,826,443 B2 | 11/2004 | Makinen |
| 6,847,959 B1 | 1/2005 | Arrouye |
| 6,853,391 B2 | 2/2005 | Bates |
| 6,865,568 B2 | 3/2005 | Chau |
| 6,869,018 B2 * | 3/2005 | Fifield et al. .................. 235/487 |
| 6,871,348 B1 | 3/2005 | Cooper |
| 6,876,900 B2 | 4/2005 | Takeda et al. |
| 6,876,996 B2 | 4/2005 | Czajkowski |
| 6,880,132 B2 | 4/2005 | Uemura |
| 6,883,009 B2 | 4/2005 | Yoo |
| 6,883,146 B2 | 4/2005 | Prabhu et al. |
| 6,906,722 B2 | 6/2005 | Hrebejk |
| 6,910,049 B2 | 6/2005 | Fenton et al. |
| 6,922,709 B2 | 7/2005 | Goodman |
| 6,925,608 B1 | 8/2005 | Neale et al. |
| 6,938,207 B1 | 8/2005 | Haynes |
| 6,944,647 B2 | 9/2005 | Shah |
| 6,947,959 B1 | 9/2005 | Gill |
| 6,966,033 B1 | 11/2005 | Gasser et al. |
| 6,973,618 B2 * | 12/2005 | Shaughnessy et al. ....... 715/239 |
| 7,168,051 B2 | 1/2007 | Robinson et al. |
| 7,171,468 B2 | 1/2007 | Yeung et al. |
| 7,191,195 B2 | 3/2007 | Koyama et al. |
| 7,194,505 B2 * | 3/2007 | Yano et al. .................... 709/203 |
| 7,409,644 B2 | 8/2008 | Moore et al. |
| 7,484,183 B2 | 1/2009 | Look |
| 7,499,925 B2 | 3/2009 | Moore et al. |
| 7,512,586 B2 | 3/2009 | Kaasten et al. |
| 7,526,483 B2 | 4/2009 | Samji et al. |
| 7,536,386 B2 | 5/2009 | Samji et al. |
| 7,536,410 B2 | 5/2009 | Wong |
| 7,555,722 B2 | 6/2009 | Karatal et al. |
| 7,587,411 B2 | 9/2009 | De Vorchik |
| 7,590,625 B1 | 9/2009 | Tennican et al. |
| 7,614,016 B2 | 11/2009 | Wong |
| 7,627,552 B2 | 12/2009 | Moore et al. |
| 7,650,575 B2 | 1/2010 | Cummins |
| 7,692,807 B1 * | 4/2010 | Sanders et al. ............... 358/1.15 |
| 7,769,752 B1 | 8/2010 | Turner et al. |
| 7,853,890 B2 | 12/2010 | Miner et al. |
| 7,890,543 B2 | 2/2011 | Hunt et al. |
| 7,917,538 B2 | 3/2011 | Gurevich |
| 2001/0012439 A1 * | 8/2001 | Young et al. .................... 386/83 |
| 2001/0034733 A1 | 10/2001 | Prompt |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0010736 A1 | 1/2002 | Marques et al. |
| 2002/0019935 A1 | 2/2002 | Andrew et al. |
| 2002/0033844 A1 | 3/2002 | Levy et al. |
| 2002/0046209 A1 | 4/2002 | De Bellis |
| 2002/0046232 A1 | 4/2002 | Adams |
| 2002/0046299 A1 | 4/2002 | Lefeber |
| 2002/0049717 A1 | 4/2002 | Routtenberg et al. |
| 2002/0049777 A1 | 4/2002 | Terayama et al. |
| 2002/0052885 A1 | 5/2002 | Levy |
| 2002/0054167 A1 | 5/2002 | Hugh |
| 2002/0059199 A1 | 5/2002 | Harvey |
| 2002/0059288 A1 | 5/2002 | Yagi |
| 2002/0062310 A1 | 5/2002 | Marmor et al. |
| 2002/0063734 A1 | 5/2002 | Khalfay et al. |
| 2002/0070965 A1 | 6/2002 | Austin |
| 2002/0075310 A1 | 6/2002 | Prabhu |
| 2002/0075312 A1 | 6/2002 | Amadio |
| 2002/0075330 A1 | 6/2002 | Rosenzweig et al. |
| 2002/0078035 A1 | 6/2002 | Frank et al. |
| 2002/0087652 A1 | 7/2002 | Davis et al. |
| 2002/0087740 A1 | 7/2002 | Castanho et al. |
| 2002/0087969 A1 | 7/2002 | Brunheroto |
| 2002/0089540 A1 | 7/2002 | Geier |
| 2002/0091679 A1 | 7/2002 | Wright |
| 2002/0091697 A1 | 7/2002 | Huang |
| 2002/0091739 A1 | 7/2002 | Ferlitsch |
| 2002/0095416 A1 | 7/2002 | Schwols |
| 2002/0097278 A1 | 7/2002 | Mandler |
| 2002/0100039 A1 | 7/2002 | Iatropoulos |
| 2002/0103998 A1 | 8/2002 | DeBruine |
| 2002/0104069 A1 | 8/2002 | Gouge et al. |
| 2002/0105548 A1 | 8/2002 | Hayton et al. |
| 2002/0107973 A1 | 8/2002 | Lennon et al. |
| 2002/0111942 A1 | 8/2002 | Campbell et al. |
| 2002/0113821 A1 | 8/2002 | Hrebejk |
| 2002/0120505 A1 | 8/2002 | Henkin et al. |
| 2002/0120604 A1 | 8/2002 | LaBarge et al. |
| 2002/0120757 A1 | 8/2002 | Sutherland |
| 2002/0129033 A1 | 9/2002 | Hoxie |
| 2002/0138552 A1 | 9/2002 | DeBruine |
| 2002/0138582 A1 | 9/2002 | Chandra et al. |
| 2002/0138744 A1 | 9/2002 | Schleicher |
| 2002/0144155 A1 | 10/2002 | Bate |
| 2002/0149888 A1 | 10/2002 | Motonishi |
| 2002/0152262 A1 | 10/2002 | Arkin et al. |
| 2002/0152267 A1 | 10/2002 | Lennon |
| 2002/0156756 A1 * | 10/2002 | Stanley et al. .................... 706/47 |
| 2002/0156792 A1 * | 10/2002 | Gombocz et al. ............. 707/100 |
| 2002/0156895 A1 | 10/2002 | Brown |
| 2002/0161800 A1 | 10/2002 | Eld et al. |
| 2002/0163572 A1 | 11/2002 | Center et al. |
| 2002/0169678 A1 | 11/2002 | Chao et al. |
| 2002/0174329 A1 | 11/2002 | Bowler et al. |
| 2002/0181398 A1 | 12/2002 | Szlam |
| 2002/0184357 A1 | 12/2002 | Traversat et al. |
| 2002/0188605 A1 | 12/2002 | Adya et al. |
| 2002/0188621 A1 | 12/2002 | Flank et al. |

(56) References Cited

U.S. PATENT DOCUMENTS

| | | | |
|---|---|---|---|
| 2002/0188735 A1 | 12/2002 | Needham |
| 2002/0194252 A1 | 12/2002 | Powers |
| 2002/0196276 A1 | 12/2002 | Corl |
| 2002/0199061 A1 | 12/2002 | Friedman |
| 2003/0001964 A1 | 1/2003 | Masukura et al. |
| 2003/0009484 A1 | 1/2003 | Hamanaka |
| 2003/0014415 A1 | 1/2003 | Weiss |
| 2003/0018657 A1 | 1/2003 | Monday |
| 2003/0018712 A1 | 1/2003 | Harrow et al. |
| 2003/0028610 A1 | 2/2003 | Pearson |
| 2003/0033367 A1 | 2/2003 | Itoh |
| 2003/0037060 A1 | 2/2003 | Kuehnel |
| 2003/0041178 A1 | 2/2003 | Brouk et al. |
| 2003/0046260 A1 | 3/2003 | Satyanarayanan |
| 2003/0050927 A1 | 3/2003 | Hussam |
| 2003/0063124 A1 * | 4/2003 | Melhem et al. ............... 345/777 |
| 2003/0065728 A1 * | 4/2003 | Milovanovic ................ 709/206 |
| 2003/0069893 A1 | 4/2003 | Kanai et al. |
| 2003/0069908 A1 | 4/2003 | Anthony |
| 2003/0074356 A1 | 4/2003 | Kaler et al. |
| 2003/0076322 A1 | 4/2003 | Ouzts et al. |
| 2003/0078918 A1 | 4/2003 | Souvignier et al. |
| 2003/0079038 A1 | 4/2003 | Robbin |
| 2003/0081002 A1 | 5/2003 | De Vorchik |
| 2003/0081007 A1 | 5/2003 | Cyr et al. |
| 2003/0084425 A1 | 5/2003 | Glaser |
| 2003/0085918 A1 | 5/2003 | Beaumont et al. |
| 2003/0093321 A1 | 5/2003 | Bodmer et al. |
| 2003/0093531 A1 | 5/2003 | Yeung et al. |
| 2003/0093580 A1 | 5/2003 | Thomas |
| 2003/0097361 A1 | 5/2003 | Huang et al. |
| 2003/0098881 A1 | 5/2003 | Nolte et al. |
| 2003/0098893 A1 | 5/2003 | Makinen |
| 2003/0101200 A1 | 5/2003 | Koyama |
| 2003/0105745 A1 | 6/2003 | Davidson |
| 2003/0105747 A1 * | 6/2003 | Ishida et al. ................ 707/3 |
| 2003/0107597 A1 | 6/2003 | Jameson |
| 2003/0110188 A1 | 6/2003 | Howard et al. |
| 2003/0110397 A1 | 6/2003 | Supramaniam et al. |
| 2003/0115218 A1 | 6/2003 | Bobbitt et al. |
| 2003/0117403 A1 | 6/2003 | Park et al. |
| 2003/0117422 A1 | 6/2003 | Hiyama et al. |
| 2003/0120678 A1 | 6/2003 | Hill |
| 2003/0120928 A1 | 6/2003 | Cato et al. |
| 2003/0120952 A1 | 6/2003 | Tarbotton et al. |
| 2003/0122873 A1 | 7/2003 | Dieberger et al. |
| 2003/0126136 A1 | 7/2003 | Omoigui |
| 2003/0126212 A1 | 7/2003 | Morris et al. |
| 2003/0135495 A1 | 7/2003 | Vagnozzi |
| 2003/0135513 A1 | 7/2003 | Quinn et al. |
| 2003/0135517 A1 | 7/2003 | Kauffman |
| 2003/0135659 A1 | 7/2003 | Bellotti et al. |
| 2003/0140115 A1 | 7/2003 | Mehra |
| 2003/0154185 A1 | 8/2003 | Suzuki |
| 2003/0158855 A1 | 8/2003 | Farnham |
| 2003/0177422 A1 | 9/2003 | Tararoukhine et al. |
| 2003/0184587 A1 | 10/2003 | Ording |
| 2003/0195950 A1 | 10/2003 | Huang et al. |
| 2003/0210281 A1 | 11/2003 | Ellis |
| 2003/0212664 A1 | 11/2003 | Breining et al. |
| 2003/0212680 A1 | 11/2003 | Bates |
| 2003/0212710 A1 | 11/2003 | Guy |
| 2003/0222915 A1 | 12/2003 | Marion |
| 2003/0225796 A1 | 12/2003 | Matsubara |
| 2003/0227480 A1 | 12/2003 | Polk |
| 2003/0227487 A1 | 12/2003 | Hugh |
| 2003/0233419 A1 | 12/2003 | Beringer |
| 2004/0001106 A1 | 1/2004 | Deutscher |
| 2004/0002993 A1 | 1/2004 | Toussaint |
| 2004/0003247 A1 | 1/2004 | Fraser et al. |
| 2004/0004638 A1 | 1/2004 | Babaria |
| 2004/0006549 A1 | 1/2004 | Mullins |
| 2004/0008226 A1 | 1/2004 | Manolis et al. |
| 2004/0019584 A1 | 1/2004 | Greening |
| 2004/0019655 A1 | 1/2004 | Uemura |
| 2004/0019875 A1 | 1/2004 | Welch |
| 2004/0030731 A1 | 2/2004 | Iftode |
| 2004/0044696 A1 | 3/2004 | Frost |
| 2004/0044776 A1 | 3/2004 | Larkin |
| 2004/0054674 A1 | 3/2004 | Carpenter |
| 2004/0056894 A1 | 3/2004 | Zaika et al. |
| 2004/0056896 A1 | 3/2004 | Doblmayr |
| 2004/0059755 A1 | 3/2004 | Farrington |
| 2004/0066410 A1 | 4/2004 | Lindhorst et al. |
| 2004/0068524 A1 | 4/2004 | Aboulhosn |
| 2004/0070612 A1 | 4/2004 | Sinclair |
| 2004/0073705 A1 | 4/2004 | Madril |
| 2004/0083433 A1 | 4/2004 | Takeya |
| 2004/0085581 A1 | 5/2004 | Tonkin |
| 2004/0088374 A1 | 5/2004 | Webb |
| 2004/0091175 A1 | 5/2004 | Beyrouti |
| 2004/0098370 A1 | 5/2004 | Garland |
| 2004/0098379 A1 | 5/2004 | Huang |
| 2004/0098742 A1 | 5/2004 | Hsieh |
| 2004/0103073 A1 | 5/2004 | Blake et al. |
| 2004/0103280 A1 | 5/2004 | Balfanz |
| 2004/0105127 A1 | 6/2004 | Cudd et al. |
| 2004/0117358 A1 | 6/2004 | von Kaenel |
| 2004/0117405 A1 | 6/2004 | Short et al. |
| 2004/0128322 A1 | 7/2004 | Nagy |
| 2004/0133572 A1 | 7/2004 | Bailey |
| 2004/0133588 A1 | 7/2004 | Kiessig et al. |
| 2004/0133845 A1 | 7/2004 | Forstall et al. |
| 2004/0142749 A1 | 7/2004 | Ishimaru et al. |
| 2004/0143349 A1 | 7/2004 | Roberts et al. |
| 2004/0146272 A1 * | 7/2004 | Kessel et al. ............... 386/46 |
| 2004/0148434 A1 | 7/2004 | Matsubara |
| 2004/0153451 A1 | 8/2004 | Phillips |
| 2004/0153968 A1 | 8/2004 | Ching |
| 2004/0162838 A1 | 8/2004 | Murayama et al. |
| 2004/0167942 A1 | 8/2004 | Oshinsky et al. |
| 2004/0168118 A1 | 8/2004 | Wong |
| 2004/0174396 A1 | 9/2004 | Jobs et al. |
| 2004/0177116 A1 | 9/2004 | McConn |
| 2004/0177148 A1 | 9/2004 | Tsimelzon |
| 2004/0177319 A1 | 9/2004 | Horn |
| 2004/0181516 A1 | 9/2004 | Ellwanger et al. |
| 2004/0183824 A1 | 9/2004 | Benson |
| 2004/0189694 A1 | 9/2004 | Kurtz et al. |
| 2004/0189704 A1 | 9/2004 | Walsh |
| 2004/0189707 A1 | 9/2004 | Moore et al. |
| 2004/0193594 A1 | 9/2004 | Moore et al. |
| 2004/0193599 A1 | 9/2004 | Liu et al. |
| 2004/0193600 A1 | 9/2004 | Kaasten et al. |
| 2004/0193621 A1 | 9/2004 | Moore |
| 2004/0193672 A1 | 9/2004 | Samji |
| 2004/0193673 A1 | 9/2004 | Samji |
| 2004/0199507 A1 | 10/2004 | Tawa |
| 2004/0205168 A1 | 10/2004 | Asher |
| 2004/0205625 A1 | 10/2004 | Banatwala |
| 2004/0205633 A1 | 10/2004 | Martinez |
| 2004/0205698 A1 | 10/2004 | Schliesmann |
| 2004/0215600 A1 | 10/2004 | Aridor |
| 2004/0220899 A1 | 11/2004 | Barney |
| 2004/0223057 A1 | 11/2004 | Oura |
| 2004/0225650 A1 | 11/2004 | Cooper |
| 2004/0230572 A1 | 11/2004 | Omoigui |
| 2004/0230599 A1 | 11/2004 | Moore |
| 2004/0230917 A1 | 11/2004 | Bales |
| 2004/0233235 A1 | 11/2004 | Rubin et al. |
| 2004/0243597 A1 | 12/2004 | Jensen et al. |
| 2004/0249902 A1 | 12/2004 | Tadayon |
| 2004/0255048 A1 | 12/2004 | Lev Ran et al. |
| 2004/0257169 A1 | 12/2004 | Nelson |
| 2005/0004928 A1 | 1/2005 | Harner |
| 2005/0010860 A1 | 1/2005 | Weiss |
| 2005/0015405 A1 | 1/2005 | Plastina |
| 2005/0027757 A1 | 2/2005 | Kiessig et al. |
| 2005/0050470 A1 | 3/2005 | Hudson et al. |
| 2005/0055306 A1 | 3/2005 | Miller et al. |
| 2005/0071355 A1 | 3/2005 | Cameron et al. |
| 2005/0080807 A1 | 4/2005 | Beilinson et al. |
| 2005/0091612 A1 * | 4/2005 | Stabb et al. ............... 715/816 |
| 2005/0097477 A1 | 5/2005 | Camara et al. |

(56) References Cited

U.S. PATENT DOCUMENTS

| | | |
|---|---|---|
| 2005/0114330 A1* | 5/2005 | Chau .................................. 707/5 |
| 2005/0114672 A1 | 5/2005 | Duncan et al. |
| 2005/0120242 A1 | 6/2005 | Mayer et al. |
| 2005/0131760 A1* | 6/2005 | Manning et al. ................. 705/14 |
| 2005/0131903 A1 | 6/2005 | Margolus et al. |
| 2005/0131905 A1 | 6/2005 | Margolus et al. |
| 2005/0138567 A1 | 6/2005 | Smith et al. |
| 2005/0149481 A1 | 7/2005 | Hesselink et al. |
| 2005/0165753 A1 | 7/2005 | Chen et al. |
| 2005/0166159 A1 | 7/2005 | Mondry et al. |
| 2005/0166189 A1 | 7/2005 | Ma |
| 2005/0171947 A1 | 8/2005 | Gautestad |
| 2005/0188174 A1 | 8/2005 | Guzak |
| 2005/0192953 A1 | 9/2005 | Neale et al. |
| 2005/0192966 A1 | 9/2005 | Hilbert |
| 2005/0207757 A1 | 9/2005 | Okuno |
| 2005/0216825 A1* | 9/2005 | Teague ....................... 715/501.1 |
| 2005/0216886 A1* | 9/2005 | Washburn ..................... 717/110 |
| 2005/0240489 A1* | 10/2005 | Lambert ......................... 705/26 |
| 2005/0243993 A1 | 11/2005 | McKinzie |
| 2005/0246331 A1 | 11/2005 | De Vorchik et al. |
| 2005/0246643 A1 | 11/2005 | Gusmorino et al. |
| 2005/0246664 A1 | 11/2005 | Michelman et al. |
| 2005/0256909 A1 | 11/2005 | Aboulhosn et al. |
| 2005/0257169 A1 | 11/2005 | Tu |
| 2005/0283476 A1 | 12/2005 | Kaasten et al. |
| 2006/0004692 A1 | 1/2006 | Kaasten et al. |
| 2006/0020586 A1 | 1/2006 | Prompt et al. |
| 2006/0036568 A1 | 2/2006 | Moore et al. |
| 2006/0053066 A1 | 3/2006 | Sherr |
| 2006/0053388 A1 | 3/2006 | Michelman |
| 2006/0059204 A1 | 3/2006 | Borthakur |
| 2006/0080308 A1 | 4/2006 | Carpentier et al. |
| 2006/0090137 A1 | 4/2006 | Cheng |
| 2006/0129627 A1 | 6/2006 | Phillips et al. |
| 2006/0143205 A1 | 6/2006 | Fuchs |
| 2006/0173873 A1 | 8/2006 | Prompt et al. |
| 2006/0200455 A1 | 9/2006 | Wilson |
| 2006/0200466 A1 | 9/2006 | Kaasten et al. |
| 2006/0200832 A1 | 9/2006 | Dutton |
| 2006/0218122 A1 | 9/2006 | Poston et al. |
| 2006/0242585 A1 | 10/2006 | Cutsinger |
| 2006/0242591 A1 | 10/2006 | Van Dok |
| 2006/0242604 A1 | 10/2006 | Wong |
| 2006/0277432 A1 | 12/2006 | Patel |
| 2007/0088672 A1 | 4/2007 | Kaasten et al. |
| 2007/0129977 A1 | 6/2007 | Forney |
| 2007/0130170 A1 | 6/2007 | Forney |
| 2007/0130182 A1 | 6/2007 | Forney |
| 2007/0168885 A1 | 7/2007 | Muller |
| 2007/0168886 A1 | 7/2007 | Hally |
| 2007/0180432 A1 | 8/2007 | Gassner et al. |
| 2007/0186183 A1 | 8/2007 | Hudson, Jr. |
| 2008/0208927 A1 | 8/2008 | Chikusa et al. |
| 2008/0222547 A1 | 9/2008 | Wong |

FOREIGN PATENT DOCUMENTS

| | | |
|---|---|---|
| EP | 1089196 | 4/2001 |
| EP | 1235137 | 8/2002 |
| GB | 2329492 | 3/1999 |
| JP | 2004362745 | 12/1992 |
| JP | 2005089173 | 4/1993 |
| JP | 07-129448 | 5/1995 |
| JP | 1996-506911 | 7/1996 |
| JP | 09244940 | 9/1997 |
| JP | 11-212842 | 8/1999 |
| JP | 2000-242655 | 9/2000 |
| JP | 2001067250 | 3/2001 |
| JP | 2001142766 | 5/2001 |
| JP | 2001154831 | 6/2001 |
| JP | 2001188702 | 7/2001 |
| JP | 2002099565 | 4/2002 |
| JP | 2002140216 | 5/2002 |
| JP | 2002182953 | 6/2002 |
| JP | 2002269145 | 9/2002 |
| JP | 2004133796 | 10/2002 |
| JP | 2002334103 | 11/2002 |
| JP | 2000348049 | 12/2002 |
| JP | 2004046870 | 2/2004 |
| NO | 20042743 A | 8/2004 |
| NO | 20042749 | 8/2004 |
| RU | 2001104531 A | 2/2003 |
| RU | 2347258 | 2/2009 |
| WO | 9322738 | 11/1993 |
| WO | 9412944 | 6/1994 |
| WO | 9414281 | 6/1994 |
| WO | 9938092 | 7/1999 |
| WO | 9949663 | 9/1999 |
| WO | 0051021 | 8/2000 |
| WO | 0157867 | 8/2001 |
| WO | 0163919 | 8/2001 |
| WO | 0167668 | 9/2001 |
| WO | 0225420 | 3/2002 |
| WO | 03001720 | 1/2003 |
| WO | 2004008348 A1 | 1/2004 |
| WO | 2004097680 | 11/2004 |
| WO | 2004107151 | 12/2004 |

OTHER PUBLICATIONS

"How Easy! Introduction to 'Storage Idea,'" NIKKEI PC 21, vol. 6, No. 1, pp. 46-53, Nikkei Business Publications, Inc., Japan, Jan. 1, 2001.

Nishimasa, Makoto, "Easily Creating a Network by Using Standard Features, Home Network Easily Realized Using Windows 2000," Windows 2000 World, vol. 6, No. 2, pp. 126-133, IDG Japan, Inc., Japan, Feb. 1, 2001.

Final Office Action mailed Dec. 20, 2011 regarding U.S. Appl. No. 11/108,743 19 pages.

Final Office Action mailed Aug. 2, 2011 regarding U.S. Appl. No. 11/213,841 18 pages.

Non-Final Office Action mailed May 25, 2011 regarding U.S. Appl. No. 13/034,385 23 pages.

Final Office Action mailed Apr. 27, 2011 regarding U.S. Appl. No. 12/767,567 8 pages.

Non-Final Office Action mailed Feb. 10, 2012 regarding U.S. Appl. No. 11/112,010 19 pages.

English Translation of the Notice of Preliminary Rejection office action summary regarding Korean Patent Appln. No. 10-2007-7006591 2 pages.

Decision on Grant from the Patent Office of the Russian Federation dated Apr. 28, 2012 regarding Russian Appln. No. 2007130847, 4 pages.

Non-Final Office Action mailed Feb. 7, 2013 in U.S. Appl. No. 12/967,827; 37 pages.

"About Dialog Boxes"; downloaded from <http://msdn.microsoft.com>; date of first publication prior to Feb. 21, 2005; 10 pages.

"About Managing Messages With Rules", Microsoft® Outlook® 2003 Help file, 3 pp.

Adobe, Inc., et al., "Adobe Photoshop CS Classroom in a Book," Dec. 1, 2003, pp. 1-29.

Adobe, Inc., et al., "Adobe Photoshop 7.0"; 2001; pp. 1-9.

Ahanger, Gulrukh, et al., Automatic Composition Techniques for Video Production, IEEE Transactions on Knowledge and Data Engineering, Nov./Dec. 1998, pp. 967-987, vol. 10, No. 6, IEEE Computer Society 1998, ISBN 1041-4347.

Alexa T. McCray, et al., Principles for Digital Library Development, May 2001, ACM, pp. 49-53.

"An Object-Oriented Model for a Multi-media Patient Folder Management System"—Fernando Ferri, Domenico M. Pisanelli & Fabrizio L. Ricci—ACM SIBGIO Newsletter, vol. 16, Issue 1, (Jun. 1996), (pp. 2-18).

Anonymous, "Organize Your Digital Media Collection," www.microsoft.com/windowsxp/using/windowsmediaplayer/getstarted/organize.mspx, Jun. 30, 2003, 3 pages.

"A Temper-Resistant and Portable Healthcare Folder"—Anciaux et al.—Hindawai Publishing Corporation, International Journal of Telemedicine and Applications—vol. 1995, Article ID 763534, (pp. 1-9).

(56) References Cited

OTHER PUBLICATIONS

A.T. McCray, et al., Extending the Role of Metadata in a Digital Library System, May 19, 1999, IEEE, pp. 190-199.
Australian Search Report for SG 200301757-1 dated Dec. 1, 2004.
Australian Search Report for SG 200301764-7 dated Mar. 30, 2006.
Blair, C. and G.E. Monahan, "Optimal Sequential File Search: A Reduced-State Dynamic Programming Approach," European Journal of Operational Research 86(2):358-365, 1995.
"BCM_GETIDEALSIZE Message"; downloaded from <http://msdn.microsoft.com>; date of first publication prior to Mar. 31, 2005; 1 page.
Bott, et al., Book titled "Special Edition Using Windows 98, Second Edition," Dec. 21, 1999, second edition, pp. 1-7.
Bott, et al., "Microsoft Windows XP Inside Out", Microsoft Press, 2001, Chapter 11, 39 pages.
Button Messages; downloaded from <http://msdn.microsoft.com>; date of first publication prior to Feb. 25, 2005; 4 pages.
"Button Styles"; downloaded from <http://msdn.microsoft.com>; date of first publication prior to Feb. 25, 2005; 2 pages.
Clay, L.M., et al., "Posting Protocol for Improved Keyword Search Success in Peer-to-Peer File Sharing Systems," Proceedings of SPIE-Int. Soc. Opot. Eng., Santa Clara, CA, Jan. 23-24, 2003, vol. 5019, pp. 138-149.
Cohen, et al., "A Case for Associative Peer to Peer Overlays"—ACM SICOMM Computer Communications Review, vol. 33, No. 1, Jan. 2003, pp. 95-100.
Cohen, J., "The Unofficial Guide to the Workplace Shell," Apr. 5, 1992, XP002227246, 45 pp., retrieved from Internet, http://www.verfasser.de/web/web.nsf/c5.
"Common Dialog Box Library," downloaded from <http://msdn.microsoft.com>; date of first publication prior to Mar. 28, 2005; 8 pages.
Cooper, A., About Face the Essentials of User Interface Design, IDG Books, 1995, p. 141.
Coster, R. and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
"CreatePropertySheetPageFunction"; downloaded from <http://msdn.microsoft.com>; date of first publication prior to Mar. 31, 2005; 1 page.
"CreateWindow Function"; downloaded from <http://msdn.microsoft.com>; date of first publication prior to Feb. 25, 2005; 5 pages.
"Creating an Enhanced Metafile," downloaded from <http://msdn.microsoft.com> date of first publication prior to Mar. 28, 2005; 2 pages.
Creating and Installing Theme Files; downloaded from <http://msdn.microsoft.com>; date of first publication prior to Feb. 21, 2005; 4 pages.
"Creating Wizards"; downloaded from <http://msdn.microsoft.com>; date of first publication prior to Mar. 31, 2005; 17 pages.
"Customizing common dialog boxes," downloaded from http:msdn.microsoft.com; date of first publication prior to Apr. 20, 2005; 4 pages.
David Campbell, "Extending the Windows Explorer with Name Space Extensions," Microsoft Systems Journal, Microsoft co., vol. 5, No. 6, Jul. 1996, pp. 89-96.
Desai, Bipin C., et al., "Resource Discovery: Modeling, Cataloguing and Searching," Seventh International Workshop on Database and Expert Systems Applications (DEXA'96), Zurich, Switzerland, Sep. 9-10, 1996, pp. 70-75, IEEE-CS Press, 1996, ISBN 0/8186-7662-0+A54.
"DestroyPropertySheetPage Function"; downloaded from <http://msdn.microsoft.com>; date of first publication prior to Mar. 31, 2005; 1 page.
"DialogProc Function"; downloaded from <http://msdn.microsoft.com>; date of first publication prior to Feb. 21, 2005; 2 pages.
DiLascia, P., "More Fun with MFC:DIBS, Palettes, Subclassing, and a Gamut of Goodies, Part III", Microsoft Systems Journal, Jun. 1997, 20 pages.
"PSM_SETCURSELID Message"; downloaded from <http://msdn.microsoft.com> date of first publication prior to Mar. 31, 2005; 1 page.
"PSM_SETFINISHTEXT Message"; downloaded from <http://msdn.microsoft.com> date of first publication prior to Mar. 31, 2005; 1 pages.
"PSM_SETHEADERTITLE Message"; downloaded from <http://msdn.microsoft.com> date of first publication prior to Mar. 31, 2005; 1 page.
"PSM_SETTITLE Message"; downloaded from <http://msdn.microsoft.com>; date of first publication prior to Mar. 31, 2005; 1 page.
"PSM_SETWIZBUTTONS Message"; downloaded from <http://msdn.microsoft.com> date of first publication prior to Mar. 31, 2005; 2 pages.
"PSN_KILLACTIVE Notification"; downloaded from <http://msdn.microsoft.com>; date of first publication prior to Mar. 31, 2005; 1 page.
"PSN QUERYCANCEL Notification"; downloaded from <http://msdn.microsoft.com>; date of first publication prior to Mar. 31, 2005; 1 page.
"PSN_SETACTIVE Notification"; downloaded from <http://msdn.microsoft.com>; date of first publication prior to Mar. 31, 2005; 1 page.
"PSN_TRANSLATEACCELERATOR Notification"; downloaded from <http://msdn.microsoft.com>; date of first publication prior to Mar. 31, 2005; 1 page.
"PSN_WIZBACK Notification"; downloaded from <http://msdn.microsoft.com>; date of first publication prior to Mar. 31, 2005; 3 pages.
"PSN_WIZFINISH Notification"; downloaded from <http://msdn.microsoft.com>; date of first publication prior to Mar. 31, 2005; 1 page.
"PSN_WIZNEXT Notification"; downloaded from <http://msdm.microsoft.> date of first publication prior to Mar. 31, 2005; pp. 3.
Rao, J.R., "Some Performance Measures of File Sharing on Multiple Computer Systems," Proceedings of the Conference on Modeling and Simulation, vol. 6, Part I, Pittsburgg, Penn., Apr. 24-25, 1976, pp. 527-530.
Rao, R., et al., "Rich Interaction in the Digital Library," Communications of the ACM 38(4):29-39. 1995.
Ray, Jay, Mac OS X Unleashed, Nov. 2001, Sams, Chapter 4. The Finder: Working with Files and Applications (pp. 1-15), Getting File Information (pp. 1-7).
Reinauer, R., "UNIX System V.# Remote File Sharing Capabilities and Administration," Unisphere 8(6):64-68, Sep. 1988.
Revelle, A Visual Search Tool for Early Elementary Science Students, Mar. 2002, Journal of Science Education and Technology, vol. 11, pp. 49-57.
"Russian Official Action and English Translation of Official Action for Application No. 2003114526/09 dated May 11, 2007, 7 pages".
Salembier, Philippe, et al., MPEG-7 Multimedia Description Schemes, IEEE Transactions on Circuits and Systems for Video Technology, Jun. 2001,pp. 748-759, vol. 11, No. 6, IEEE Computer Society, 2001, ISBN 1051-8215.
Seltzer, M., et al., "Journaling Versus Soft Updates: Asynchronous Meta-data Protection in File Systems," Proceedings of the 2000 USENIX Technical Conference, San Diego, CA Jun. 18-23, 2000, pp. 71-84.
Shah, Sarju, "Windows XP Preview", FiringSquad, May 4, 2001, online, printed pp. 1-5; Figure: Hi-Res Image Viewer.
Sikora, Thomas, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.
Simpson, Alan, Windows 95 Uncut, 1995, IDG Books Worldwide, Inc., pp. 104-107.
Stanek R. William, "Microsoft Windows XP Professional Administrator's Pocket Consultant", Sep. 25, 2001; Microsoft Press, Chapter 9, printed pp. 1-8.

(56) References Cited

OTHER PUBLICATIONS

Stelovsky, J. and C. Aschwanden, "Software Architecture for Unified Management of Event Notification and Stream I/O and Its Use for Recording and Analysis of User Events," Proceedings of the 35th Annual Hawaii International Conference on System Sciences, IEEE Computer Society, Big Island, Hawaii, Jan. 7-10, 2002, p. 1862-1867.
Supplementary European Search Report A33for EP 04780390 dated Jun. 18, 2007.
"Survey of Some Mobile Agent System"—Zhujun (James) Xu—Feb. 10, 2003 (p. 1-22).
Templin, P.J., Jr., "Providing a Centralized File Sharing Resource at Bucknell University", Proceedings of the User Services Conference for College and University Services Organization, Bloomington, Ind., Oct. 25-28, 1998, pp. 289-292.
Tony Northrup et al., "Plus! Party Mode: Mix Audio and Video in Playlists," www.microsoft.com/windowsxp/using/windowsmediaplayer/expert/northrup_03march17.mspx, Mar. 17, 2003, 6 pages.
"Trillian/Trillian Pro IM Clients" Products Description, © 1999-2004 Cerulean Studios, <http://ceruleanstudios.com> [retrieved Apr. 30, 2004].
"Using Buttons"; downloaded from <http://msdn.microsoft.com>; date of first publication prior to Feb. 25, 2005; 5 pages.
"Using Common Dialog Boxes," downloaded from <http://msdn.microsoft.com>; date of first publication prior to Mar. 28, 2005; 8 pages.
"Using Tags to Organize Your Photos," Adobe Photoshop Album 2.0 Tutorial, Available: http://www.adobe.com/digitalimag/tips/phsaltaggin/pdfs/phsaltaggin.pdf, Apr. 30, 2004.
Venolia, G.D., et al., Supporting Email Workflow. Microsoft Research Technical Report MSR-TR-2001-88. Revised Dec. 2001 (Original Sep. 2001). Microsoft Corporation, Redmond, WA.
Venolia, G.D. and C. Neustaedter, Understanding Sequence and Reply Relationships with Email Conversations: A Mixed-Model Visualization. Microsoft Research Technical Report MSR-TR-2002-102, Sep. 23, 2002 (Revised Jan. 13, 2003).
"Visually Theming and Styling Your Applications and Documents" (CLI308); downloaded from <http://msdn.microsoft.com/longhorn/pdctalksavalon/>; date of first publication prior to Mar. 31, 2005; 34 pages.
Wang, G., et al., "Extending XML Schema with Nonmonotonic Inheritance," in M.A. Jesufeld and O. Paster (eds.), ER 2003 Workshops, Lecture Notes in Computer Science 2814:402-407.2003.
Wedde, Horst F., et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.
Weinreich, H., et al., "The Look of the Link—Concepts of the User Interface of Extended Hyperlinks", Proceedings of the Twelfth ACM Conference on Hypertext and Hypermedia, Hypertext '01, Aarhus, Denmark, Aug. 2001, pp. 19-28.
Wikipedia, File Allocation Table, 2006, <http://en.wikipedia.org/wiki/File_Allocation_Table>.
Windows Commander, <http://web.archive.org/web/20021017022627/www.ghisler.com/addons.htm> and <http://web.archive.org/web/20021017022627/www.ghisler.com/addons.htm>, first date of publication unknown but, prior to Jul. 31, 2006, 7 pages.
Windows Forms: Exploiting Windows Longhorn "Features from Within Your Application" (CLI391); downloaded from http://msdn.microsoft.com/longhorn/pdcmaterials/pdctalksavalon/>:date of publication prior to Mar. 31, 2005; 27 pages.
Written Opinion of SG 200301764-7 dated Jan. 11, 2007.
Written Opinion of Singapore Application No. 200403220-7 dated May 18, 2006.
Yamai, N. et al., "NFS-Based Secure File System Over Multiple Administrative Domains With Minimal Administration," Systems and Computers in Japan 33(14):50-58, Dec. 2002.
Yeates, Stuart, et al., "Tag Insertion Complexity," Data Compression Conference, (DCC 2001), Snowbird, Utah, USA, Mar. 27-28, 2001, pp. 243-252, IEEE Computer Society 2001, ISBN 1068-0314.
Dorot V., Explanatory Dictionary on Modern Computer Vocabulary, S. Petersburg, BHV-Petersburg, pp. 218-219. (Attached).
"DRAWITEMSTRUCT Structure"; downloaded from <http://msdn.microsoft.com>; date of first publication prior to Feb. 25, 2005; 3 pages.
Ed Bott et al., "Master Your Music Library," www.microsoft.com/windowsxp/using/windowsmediaplayer/expert/bott_03may05.mspx, May 5, 2003, 7 pages.
English translation of Office Action for CN03801850.0, dated Aug. 10, 2007.
Esposito, D., "More Windows 2000 UI Goodies: Extending Explorer Views by Customizing Hypertext Template Files", MSDN Magazine, <http://msdn.microsoft.com/msdnmag/issues/0600/w2kui2/defaultaspx?print=true?,first date of publication unknown but no later than Jun. 2000, 15 pages.
Esposito, D., Visual C++ Windows Shell Programming, Dec. 1, 1998, Apress, ISBN 1861001843, pp. 463-469.
Esposito, Dino, More Windows 2000 UI Goodies: Extending Explorer Views by Customizing Hypertext Template Files, first date of publication unknown, but prior to Jun. 16, 2006, 15 pages.
Esposito, Dino, "New Graphical Interface: Enhance Your Programs with New Windows XP Shell Features," MSDN Magazine, Nov. 2001, vol. 16, No. 11.
European Search Report dated Sep. 20, 2007 for European Patent Application No. 05 10 3492, 9 pages.
Lee, Kyu Yong, et al., Metadata Management of the SANtopia File System, Proceedings of the 8th International Conference on Parallel and Distributed Systems (ICPADS 2001), Kyoungju City, Korea, Jun. 26-29, 2001, pp. 492-499, IEEE Computer Society, 2001, ISBN 0/7695-1153-8+A499.
"Examination Report for New Zealand Patent No. 534665 dated Jul. 27, 2007".
Examples of dialogs user interfaces; date of first publication prior to Mar. 31, 2005; 8 pages.
Faichney, Jolon, et al.; Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.
Feng, et al., "Schemata Transformation of Object-Oriented Conceptual Models to XML", Computer Systems Science & Engineering, vol. 18, No. 1, Jan. 2003.
"GetOpenFileNameFunction," downloaded from <http://msdn.microsoft.com>; date of first publication prior to Mar. 28, 2005; 2 pages.
GetSaveFileNameFunction, downloaded from <http://msdn.microsoft.com>; date of first publication prior to Mar. 28, 2005; 2 pages.
Gifford, D.K., et al., "Semantic File Systems," Proceedings of the 13th ACM Symposium on Operating Systems Principles, Pacific Grove, CA, Sep. 1991, pp. 16-25.
Heinlein, et al.; "Integration of Message Passing and Shared Memory in the Stanford FLASH Multiprocessor, Architectural Support for Programming Languages amd Operating Systems," pp. 38-50, published 1994.
"How to Use a Common Dialog File Open Dialog with Win32 API," downloaded from <http://support.microsoft,com>; date of first publication prior to Mar. 28, 2005; 3 pages.
Hunter, Jane, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.
Joseph, M., "The UML for Data Modellers," Elektron, Apr. 2004, pp. 72-73.
"International Search Report and Written Opinion of PCT/US04/25931 dated Apr. 3, 2007".
International Search Report of PCT/US05/26655 dated Jun. 23, 2005.
International Search Report of WO2004/097638 A1 (McKee, et al.) dated Nov. 11, 2004.

(56) References Cited

OTHER PUBLICATIONS

Kuchinsky, et al., "FotoFile: A Consumer Multimedia Organization and Retrieval System", May 1999, ACM, pp. 496-503.
Louis, et al.; "Context Learning Can Improve User Interaction Information Reuse and Integratioin," Proceedings of the 2004 IEEE International Conference on, pp. 115-120, Nov. 8-10, 2004.
Lui, et al., "Interoperability of Peer-to-Peer File Sharing Protocols"—ACM SIGecom Exchanges, vol. 3, No. 3, Aug. 2002, pp. 25-33.
"MessageBox Function"; downloaded from from <http://msdn.microsoft.com>; date of first publication prior to Mar. 31, 2005; 4 pages.
Andy Rathbone, Windows XP for Dummies, 2001, Wiley Publishing, Inc., pp. 145, 203, 204.
Grosky, et al., "Using Metadata for Intelligent Browsing of Structured Media Objects", Dec. 1994, Sigmond Record, vol. 23, No. 4, pp. 49-56.
"How knowledge workers use the web"—Abigail J. Sellen, Rachel Murphy and Kate L. Shaw—conference on Human Factors in Computing Systems, Proceedings of the SIGCHI conference on Human Factors in Computing Systems: Changing our world, changing ourselves—ACM—2002 (pp. 227-234).
"Implementing Windows Terminal Server and Citrix MetaFrame on IBM @server x Series Servers"—Darryl Miles—Apr. 2003 (pp. 1-62).
International Search Report dated Dec. 7, 2005 for PCT Application Serial No. PCT/US05/13589, 5 pages.
International Search Report for PCT/US06/26854 dated Sep. 25, 2007.
International Search Report of EP 03007786 dated Aug. 6, 2004.
International Search Report of EP 0315717 dated Aug. 26, 2003.
International Search Report of EP 03007909 dated Jun. 13, 2006.
International Search Report of PCT/US03/15625 dated Aug. 8, 2003.
Luiz F. Capretz et al., "Component-Based Software Development," IECON'01: The 27th Annual Conference of the IEEE Industrial Electronics Society, IEEE, Nov. 2001, pp. 1834-1837.
International Search Report of PCT/US05/27258 dated Aug. 1, 2005.
Jamsa, K., 1001 Windows 98 Tips, Jamsa Press, 1998, 2 pages.
Japanese Patent Office, Notice of Rejection mailed on Feb. 17, 2009, 10pp, Japanese Patent No. 2004-571417.
Kumiko Sekiguchi, "Visual Basic Q&A," msdn magazine 2001, No. 16, pp. 97-103, ASCII Inc., Japan, Jul. 18, 2001.
Kwon, G. and K.D. Ryu, "An Efficient Peer-to-Peer File Sharing Exploiting Hierachy and Asymmetry," Proceedings on the 2003 Symposium on Applications and the Internet, Orlando, FL, Jan. 27-31, 2003, pp. 226-233.
Langer, Maria, Mac OS X: Visual QuickStart Guide: Apr. 2001, Peachpit Press, Mac OS X Disk Organization (pp. 1-3), Views (pp. 1-11), Outlines (1-3).
Lee, J., "An End-User Perspective on File-Sharing Systems," Communications of the ACM 46(2):49-53, Feb. 2003.
Manber, U. and S. Wu, "GLIMPSE: A Total Tool to Search Through Entire File Systems," Proceedings of USENIX Winter 1994 Conference, San Francisco, CA, Jan. 17-21, 1994.
Manjunath, B.S., et al., "Color and Texture Descriptors, IEEE Transactions on Circuits and Systems for Video Technology," Jun. 2001, pp. 703-715, vol. 11, No. 6, IEEE Computer Society, 2001, ISBN 1051-8215.
Mark Russionovich, "Internal Structure of NTFS4.0-Second Volume," Nikkei Windows 2000, No. 53. pp. 176-182, Nikkei Business Publications, Inc., Japan, Aug. 1, 2001.
McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia-printed pp. 1-3.
McFedries, Paul, "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.
MessageBoxFunction; downloaded from <http://msdn.microsoft.com>; date of first publication prior to Mar. 31, 2005; 4 pages.
Michael Halvorson and Michael Young, Microsoft Office XP, Processional Official Manual, 1st Ed., Nikkei BP Soft Press, Jul. 23, 2001, pp. 78-80.
Microsoft Digital Image Suite User's Manual, Version 9.0, pp. 105-118, Available: http://www.microsoft.com/products/imaging/guides/SuiteManual.pdf, Apr. 30, 2004.
Microsoft: "Microsoft Windows 2000 Professional Step by Step—Lesson 3—Managing Files and Folders" <http://www.microsoft.com/mspress/books/sampshap/1589.asp>, Jan. 5, 2000, 12 pages.
Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.
Microsoft Press Pass, "Windows XP is Here!", New York, Oct. 25, 2001.
Microsoft Press, Windows 98 Step by Step, Microsoft Corporation, p. 63, 1998.
Microsoft Windows XP Professional, 1985-2001.
Microsoft, Windows XP Professional, Screen Shots 1-8, copyright (1985-2001).
Microsoft Windows XP Version 2002 (Screen Dumps, Figs. 1-16).
Na, J. and V. Rajaravivarma, "Multimedia File Sharing in Multimedia Home or Office Business Networks," Proceedings of the 35th Southeastern Symposium on System Theory, Morgantown, W.Va., Mar. 16-18, 2003, pp. 237-241.
New User Interface Possibilities in Longhorn (CLI 304); downloaded from <http://msdn.microsoft.com/longhormn/pdcmaterials/pdctalksavalon/>; date of first publication prior to Mar. 31, 2005; 45 pages.
Ohtani, A., et al., "A File Sharing Method for Storing Area Network and Its Performance Verification," NEC Res. & Develop. 44(1):85-90, Jan. 2003.
Olivie, et al., "A Generic Metadata Query Tool", 1999, pp. 1-8.
"Open and Save as Dialog Boxes," downloaded from <http://msdn.microsoft.com>; date of first publication prior to Mar. 29, 2005; 9 pages.
"OPENFILENAME Structure," downloaded from <http:msdn.microsoft.com>; date of first publication prior to Mar. 28, 2005; 7 pages.
Piernas, J., et al., "DualFS: A New Journaling File System Without Meta-Data Duplication," Conference Proceedings of the 2002 International Conference on Supercomputing, New York, Jun. 22-26, 2002, p. 137-146.
Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.
Patent Abstracts of Japan, Publication No. 2002-099565, date of publication of application May 4, 2002, 1 page, Information Retrieval Apparatus, Abstract.
Patent Abstracts of Japan, Publication No. 2002-334103, date of publication of application Nov. 22, 2002, 1 page, Retrieval Processing System and Retrieval Processing Method, Abstract.
"Presto: an experimental architecture for fluid interactive document spaces"—Paul Dourish, W. keith Edwards, Anthony LaMarca and Michael Salisbury—ACM Transactions on Computer-human Interaction (TOCHI) vol. 6, Issue 2 ACM Jun. 1999 (pp. 133-161).
"PropertySheet Function"; downloaded from <http://msdn.microsoft.com>; date of first publication prior to Mar. 31, 2005; 2 pages.
"PROPSHEETHEADER Structure"; downloaded from <http://msdn.microsoft.com>; date of first publication prior to Mar. 31, 2005; 5 pages.
"PROPSHEETPAGE Structure"; downloaded from <http://msdn.microsoft.com>; date of first publication prior to Mar. 31, 2005; 4 pages.
"PropSheetProc Function"; downloaded from <http://msdn.microsoft.com>; date of first publication prior to Mar. 31, 2005; 2 pages.

(56) References Cited

OTHER PUBLICATIONS

"Property Sheets and Inspectors"; downloaded from <http://msdn.microsoft.com>: date of first publication prior to Feb. 21, 2005; 6 pages.

"Property Sheets": downloaded from <http://msdn.microsoft.com>: date of first publication prior to Mar. 31, 2005; 7 pages.

"Property Sheet Reference"; downloaded from <http://msdn.microsoft.com>: date of first publication prior to Mar. 31, 2005; 5 pages.

"PropSheetPageProc Function"; downloaded from <http://msdn.microsoft.com>; date of first publication prior to Mar. 31, 2005; 2 pages.

"PROPSHEETPAGE"; downloaded from <http://msdn.microsoft.com>' date of first publication prior to Feb. 21, 2005; 3 pages.

"PSM_PAGETOINDEX Message"; downloaded from <http://msdn.microsoft.com>' date of first publication prior to Mar. 31, 2005; 1 page.

"PSHNOTIFY Structure"; downloaded from <http://msdn.microsoft.com>; date of first publication prior to Mar. 31, 2005; 1 page.

"PSM_PRESSBUTTON Message"; downloaded from <http://msdn.microsoft.com>' date of first publication prior to Mar. 31, 2005; 1 page.

"PSM_ADDPAGE Message"; downloaded from <http://msdn.microsoft.com>' date of first publication prior to Mar. 31, 2005; 2 pages.

"PSM_HWNDTOINDEX Message"; downloaded from <http://msdn.microsoft.com>; date of first publication prior to Mar. 31, 2005; 1 page.

"PSM_QUERYSIBLINGS Message"; downloaded from <http://msdn.microsoft.com>' date of first publication prior to Mar. 31, 2005; 1 page.

"PSM_IDTOINDEX Message"; downloaded from <http://msdn.microsoft.com>' date of first publication prior to Mar. 31, 2005; 1 page.

"PSM_INDEXTOHWND Message"; downloaded from <http://msdn.microsoft.com>' date of first publication prior to Feb. 21, 2005; 1 page.

"PSM_SETCURSEL Message"; downloaded from <http://msdn.microsoft.com>' date of first publication prior to Mar. 31, 2005; 1 page.

"PSM_INDEXTOID Message"; downloaded from <http://msdn.microsoft.com>' date of first publication prior to Mar. 31, 2005; 1 page.

"PSM_INDEXTOPAGE Message"; downloaded from <http://msdn.microsoft.com>' date of first publication prior to Mar. 31, 2005; 1 page.

Notice of Allowance dated Oct. 9, 2013 in U.S. Appl. No. 12/183,724, 21 pages.

Notice of Allowance dated Nov. 7, 2013 in U.S. Appl. No. 12/193,445, 19 pages.

\* cited by examiner

SAVE PREVIEW REPRESENTATION OF FILES BEING CREATED

CROSS-REFERENCE TO RELATED APPLICATIONS

This application claims the benefit of U.S. Provisional Patent Application Ser. No. 60/566,502, entitled "METADATA EDITING CONTROL," and filed Apr. 29, 2004, and is a continuation-in-part of U.S. patent application Ser. No. 10/950,075, entitled "METADATA EDITING CONTROL," and filed Sep. 24, 2004 now U.S. Pat. No. 7,421,438, the specifications for which are hereby incorporated by reference.

STATEMENT REGARDING FEDERALLY SPONSORED RESEARCH OR DEVELOPMENT

None.

TECHNICAL FIELD

The present application relates generally to the field of computer software. More particularly, the application relates to a system and method for providing an improved user interface when creating and editing documents. The application also relates to graphical user interface elements as used in the process of creating files on a computer system.

BACKGROUND OF THE INVENTION

Seeing is believing. Computers and computing devices have penetrated all aspects of our lives, and this is due in large part to the industry's concerted efforts at making these devices easy to use and understand. One of the key advances in this area has been the graphical user interface (GUI). Before such interfaces, computer users were forced to learn how to interact with computers though a command line interface. Such interfaces were notorious for strict syntax requirements that made them difficult to learn and use, but the GUI changed that. Today, users are accustomed to visualizing data files and computer resources as visual representations, such as indicia, and seeing those representations makes it easier for users to understand what they are doing and believe that they are doing it right.

As computing systems become more and more sophisticated, the GUI will be used to convey more and more information. Users have come to depend on the GUI to tell them all they need to know about their system and its files. However, current GUI offerings fall short of providing sufficient information.

One area in which current GUIs fall short deals with the way files are represented during the file creation process. FIG. 2 shows an example of a Save File dialog 201 used in the MICROSOFT WINDOWS® operating system (MICROSOFT WINDOWS®, XP®, EXCEL®, POWERPOINT® and WORD® used herein are trademarks of Microsoft Corporation, Redmond Wash.). The dialog 201 has a graphic area 202 in which indicia 203 may appear showing the user the files and/or folders that are on the system. This information will tell the user where there file will be saved, and may include data fields 204 to allow the user to enter data concerning the file to be saved.

The user viewing the dialog 201 assumes that, at the completion of the save process, the new file will appear in the area 202 the next time that particular view is entered. However, this is merely an assumption, and the system does not offer the user any confirmation as to how the new file will appear the next time view area 202 is opened. The user is offered no visual confirmation as to where the new file will go, or how it will appear the next time an area 202 is opened.

Furthermore, users have come to depend on the visual organization of the various indicia 203 to help them locate files, but for the new file that is being saved, the user cannot view any such organization until after the file is saved. That may be too late; particularly if the user misunderstood the location information presented in dialog 201 during the save process. Perhaps the user assumed that the new file would be placed at the top level of the area 202, when in actuality the file is saved within one of the folders represented by indicia 203 because one was inadvertently highlighted as the user pressed "Save." To find the missing file, the user would have to hunt for it, navigating through several folders to find it again.

The lack of feedback during the save process creates problems for the user, and ultimately makes the system more difficult to use than it should be. Accordingly, there is a need for an improved approach to guide the user through the process of file creation; one that can help make sure that there are no misunderstandings between the system and the user with respect to how the new file can be found again.

SUMMARY OF THE INVENTION

Aspects of the present invention may meet one or more of the above needs, and overcome one or more deficiencies in the prior art, by providing a system and method in which the user is given a preview representation of a file that is about to be created.

The preview may appear as part of a save file dialog, and may show an indicia corresponding to the new to-be-created file, and may show how the new file may be visually represented in the GUI after the save is performed.

The preview may exhibit certain behaviors, such as having a unique appearance, always appearing as a first element, to be easily noticed by the user. Users may also interact with the preview to manage the file and/or edit its properties even before the file is saved.

The preview may also intelligently guide the user through the save process by, for example, refusing to allow the user to save the file to an invalid location, or automatically populating metadata fields based on user navigation through the GUI.

BRIEF DESCRIPTION OF THE DRAWINGS

Features of the applicants' system are described in detail below with reference to the attached drawing figures, wherein.

DETAILED DESCRIPTION OF THE INVENTION

The present invention relates to a system and method for providing an improved user experience when creating files by offering users a preview representation of a file that is about to be created on a system. An exemplary operating environment for the present invention is described below.

Figure 1:
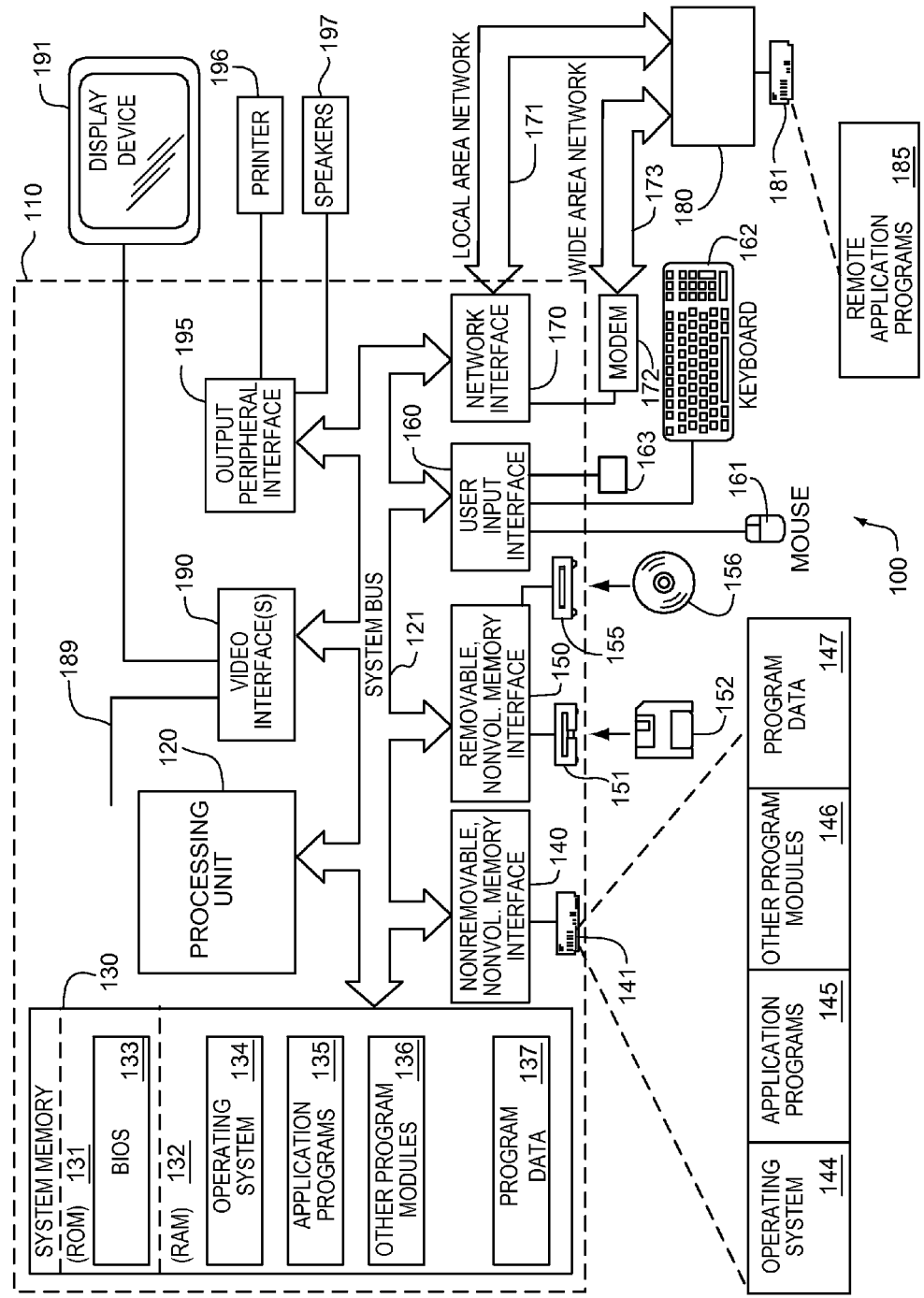
FIG. 1 is a block diagram of a computing-system environment suitable for use in implementing one or more features described herein.

Referring to the drawings in general and initially to FIG. 1 in particular, wherein like reference numerals identify like components in the various figures, an exemplary operating environment is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The features described herein may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the features may be practiced with a variety of computer-system configurations, including hand-held devices, multiprocessor systems, microprocessor-based or programmable-consumer electronics, minicomputers, mainframe computers, and the like. They may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 includes a general purpose computing device in the form of a computer 110 including a processing unit 120, a system memory 130, and a system bus 121 that couples various system components including the system memory 130 to the processing unit 120. If desired, any of the elements described herein may be implemented as standalone elements (e.g., a single processing unit), or as multiple elements working in concert (e.g., multiple processing units).

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Other internal components of the computer 110 are possible, but not shown. For example, various expansion cards such as television-tuner cards and network-interface cards may be incorporated within a computer 110.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the features described herein may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

Figure 2:
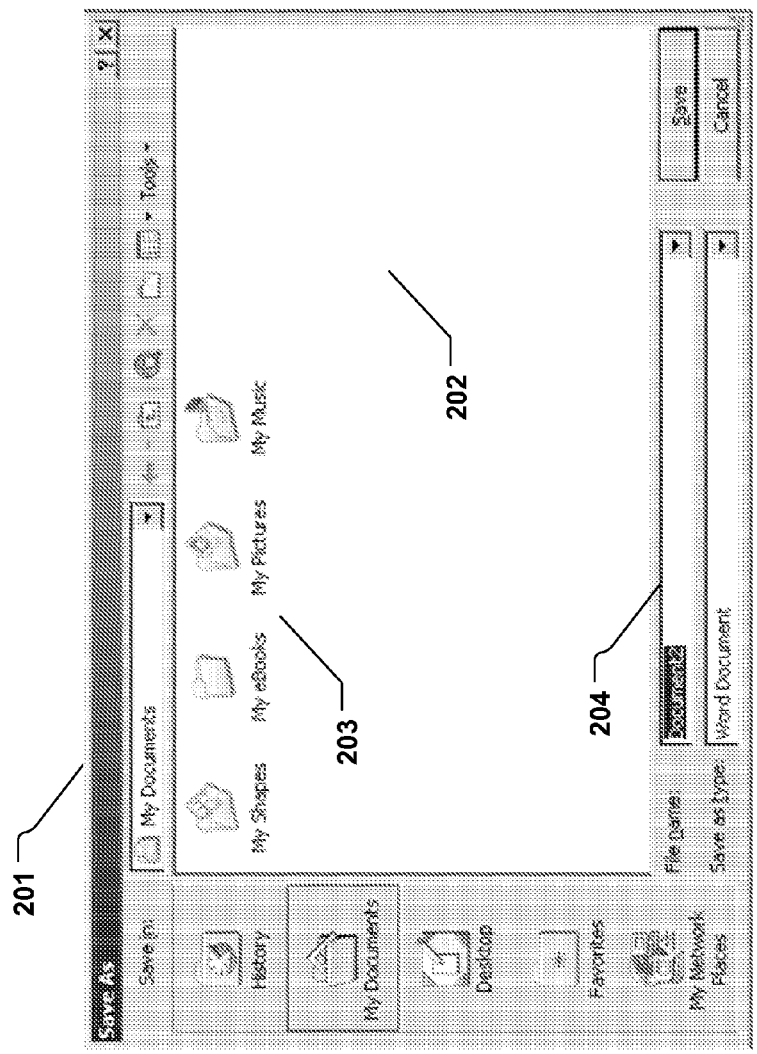
FIG. 2 illustrates a prior art Save As dialog used for saving files.

FIG. 2 has already been addressed above, and depicts a Save As file dialog used in the MICROSOFT WINDOWS XP™ operating system.

Figure 3:
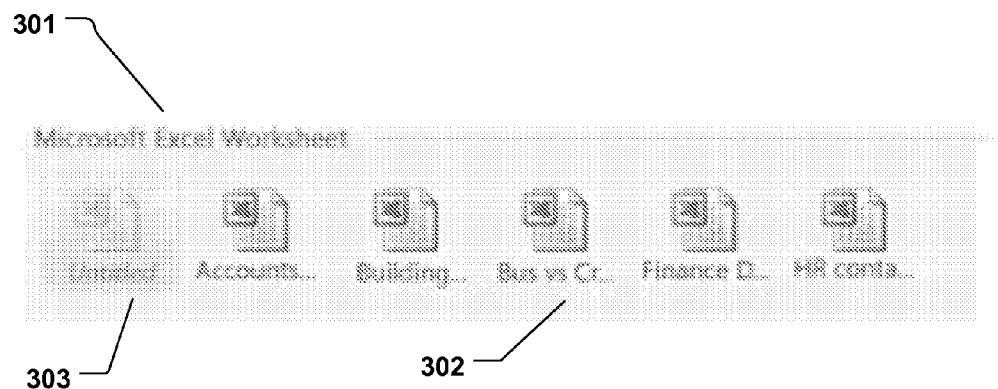
FIG. 3 depicts an example GUI view containing a preview representation of a file that is about to be created on the system.

FIG. 3 depicts an example view 301 that may be found in a GUI when saving a file, such as in area 202 of the dialog in FIG. 2. In view 301, various indicia 302 are shown depicting files that exist according to the criteria used to generate the view 301. Such criteria may be varied depending on user preference. For example, view 301 may be generated to display the contents of a given folder on the system. Alternatively, view 301 may display all files of a given file type (e.g., MICROSOFT EXCEL™ Worksheet is shown in the FIG. 3 example). View 301 may also result from combinations of criteria. For example, the view 301 may be a view of all worksheets that belong to a certain user, or to a certain project, or that are stored in a certain folder. Possible criteria are near limitless, and include, in addition to the ones already listed above, file size, creation date, edit date, project, owner, memory location, user, file name, etc.

View 301 may depict a preview representation 303, or ghost, representing the file that is about to be saved on the system, where the ghost shows the user where the new file will appear in the GUI should the save operation be performed, and identifies the location or view in which the new file will be found if saved. In the FIG. 3 example, the file has not been given a name yet, so it bears a label of "Untitled." The ghost 303 may have a distinct appearance to indicate that it represents a file that is not yet technically a stored file on the system. The distinction in appearance may be a transparency or opacity setting, color, font, highlight, or any other way of offering a different appearance. To help ensure that the user does not lose track of the ghost 303 as the user navigates through different views (e.g., selecting a different folder in which to store the file), the ghost 303 may be configured to always appear in a predetermined location in the view. For example, and as shown in FIG. 3, the ghost 303 may be configured to appear as the first indicia shown. The difference in appearance may correspond to changes that occur when a file is selected. For example, the ghost 303 may be selected by default, and its indicia may have whatever appearance is used in the system to denote selected objects (e.g., may be the same distinction discussed above).

Figure 4:
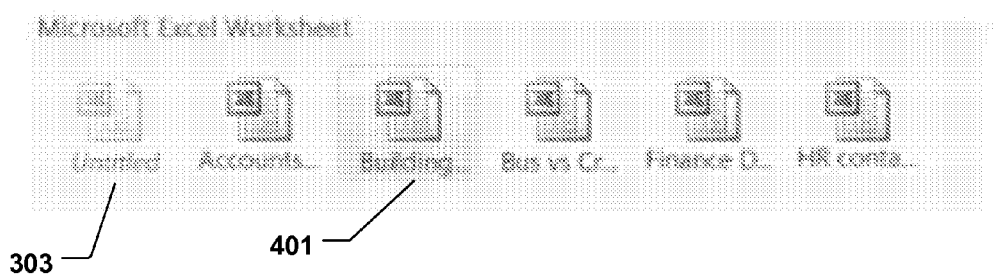
FIG. 4 depicts another example GUI view containing a preview representation of a file that is about to be created on the system.

The ghost 303 may be treated as any other indicia in the view 301. Users may select, highlight, modify, drag and drop, etc. the ghost 303 as they would any other indicia. FIG. 4 depicts an example of the FIG. 3 view 301, in which an indicia 401 representing an existing file on the system has been selected by the user. That is, indicia 401 may be given a distinct appearance as well, and may be given an appearance that is distinct from the ghost 303. However, the ghost may include additional functionality not associated with the indicia 401 for files that already exist. For example, ghost 303 may be associated with a unique context menu of functions and options that are applicable to files that aren't already saved.

Figure 5:
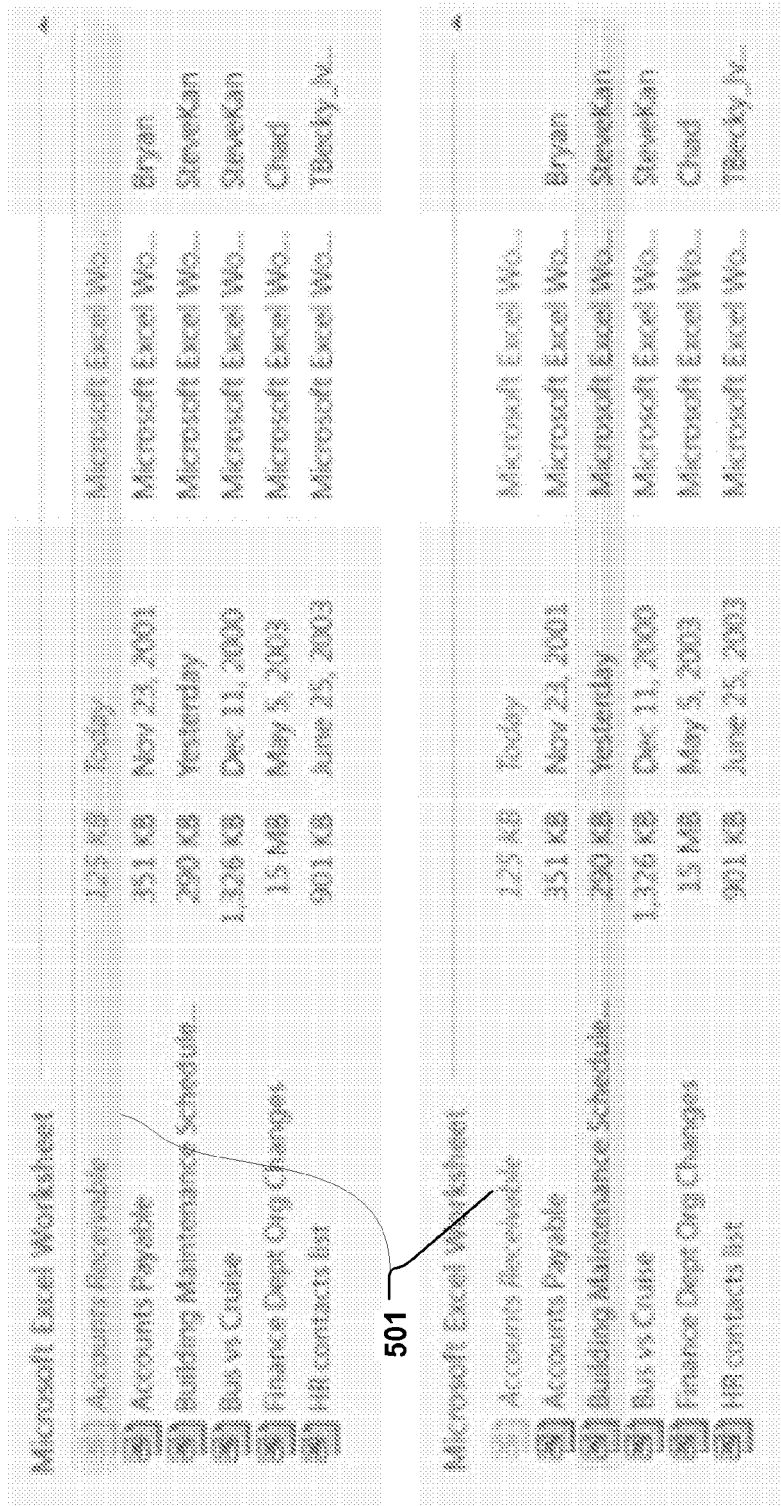
FIG. 5 depicts two additional examples of GUI views containing a preview representation of a file that is about to be created on the system.

Ghosts are not limited to GUIs and views in which large indicia are used. To the contrary, they may appear in other types of views as well, such as a listing as shown in FIG. 5. In FIG. 5, ghosts 501 give the user a preview representation of a file that is about to be saved (in the example, the file has been named "Accounts Receivable").

Figure 6:
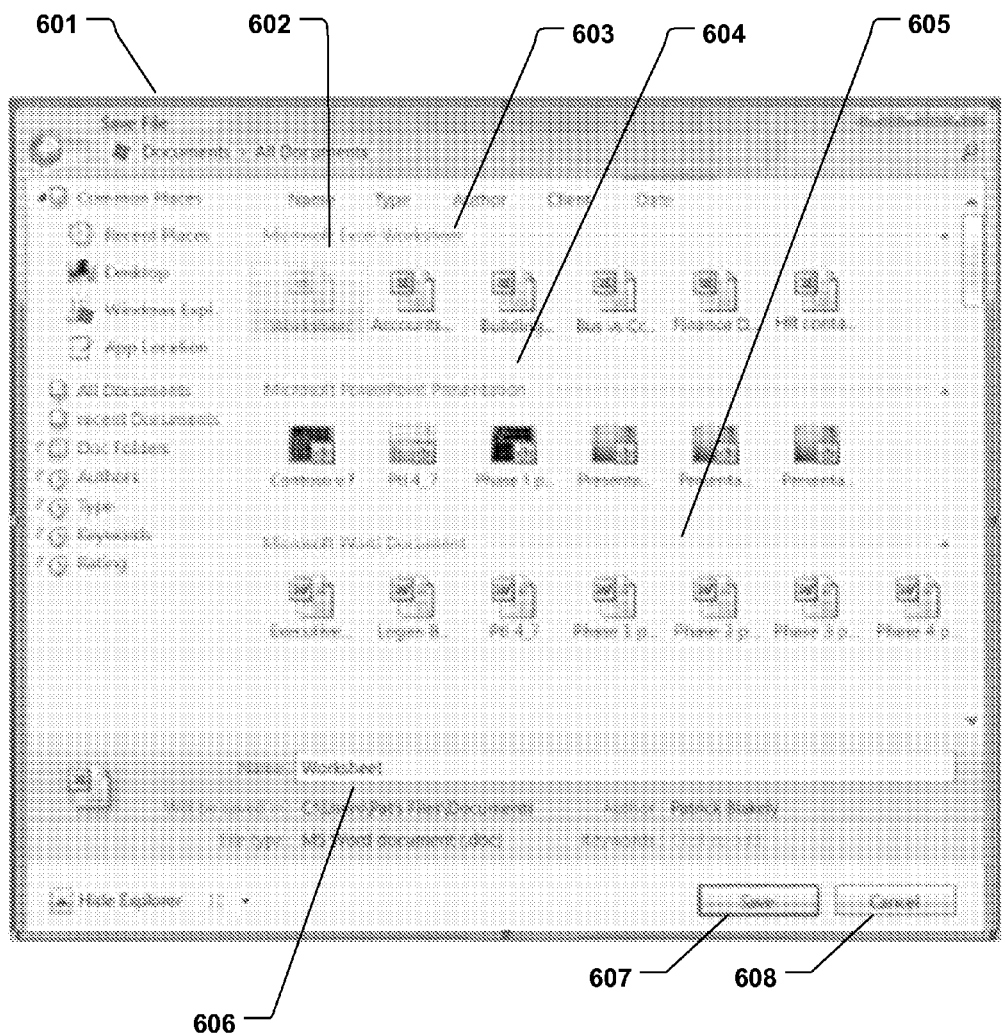
FIG. 6 depicts an example Save File dialog offering a preview representation of a file that is about to be created on the system.

The ghost may be incorporated into the GUI for a system file panel or common file dialog, such as the Save File dialog 601 shown in FIG. 6, which may be shared by a plurality of applications on the system. In the dialog/panel 601, ghost 602 may appear to provide the preview representation of how the new file will appear once it is saved. In this example, three views 603, 604, 605 are shown, where one view 603 contains indicia for MICROSOFT EXCEL® worksheet files, one view 604 contains indicia for MICROSOFT POWERPOINT® presentation files, and one view 605 contains indicia for MICROSOFT WORD® documents. The ghost 602 appears in the first view 603 because the file is presently set to be saved as a MICROSOFT EXCEL® worksheet. This setting is shown in the metadata portion 606 of the display, which may display a set of metadata (e.g., author, file type, etc.) for the file that is about to be saved.

The user can interact with the ghost 602 to change the metadata of the file that is about to be saved. The user may drag and drop the ghost 602 onto different views to change the new file's properties to match those of the new view in which the ghost 602 is dropped. For example, if a file type is to be changed, by clicking and dragging the ghost 602 from the worksheet view 603 to the presentation view 604, the system may automatically update the metadata 606 to reflect that the new file will be of type "presentation" instead of type "worksheet." Similarly, other changes in metadata may be made by moving the indicia. For example, if one view corresponds to items having a first priority, and a second view corresponds to items having a second priority, moving the indicia from the first to the second may change the document's priority level to match the second view.

Changes made to the metadata may also be automatically reflected in the ghost 602. For example, should the user enter in a different file name or type in metadata 606, the ghost 602 may automatically change and/or reposition itself to reflect the new metadata, changing the title to the new name, and repositioning itself into the correct view based on the new file type (e.g., into view 604 if the user changes the type to a presentation). As another example, if a view shows a first priority, and the priority is changed in the metadata, the indicia may be moved to a different view showing documents having the new priority. In some instances, this may cause the ghost to completely disappear from the user's current screen, if the ghost 602 is repositioned to a view or location that is not currently displayed on the screen.

The Save File dialog may also include a Save button 607 and cancel button 608 for performing or aborting the save process.

Figure 7A:
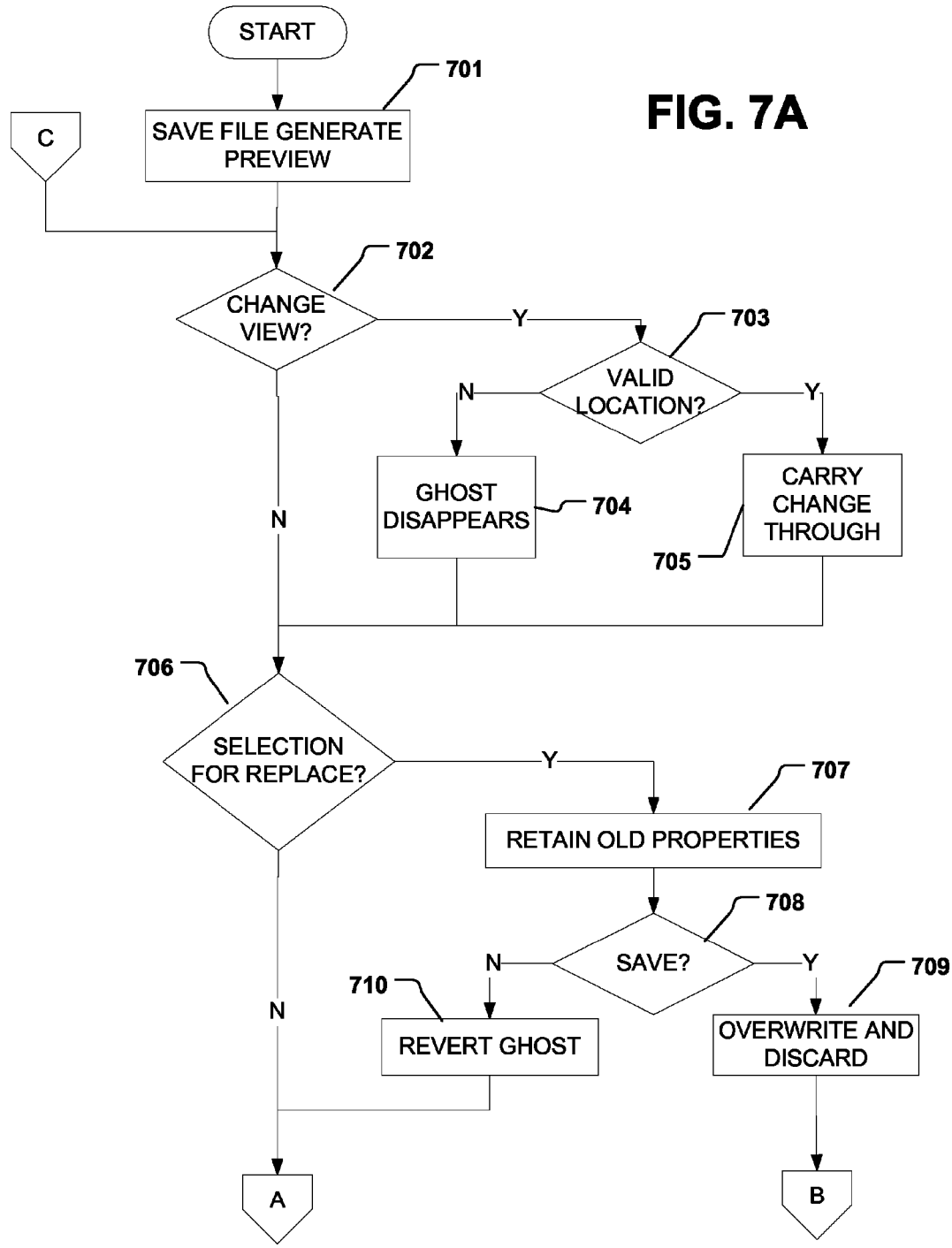
FIGS. 7A-B depict an example process for implementing a preview representation of a files that is about to be created on the system.
Figure 7B:
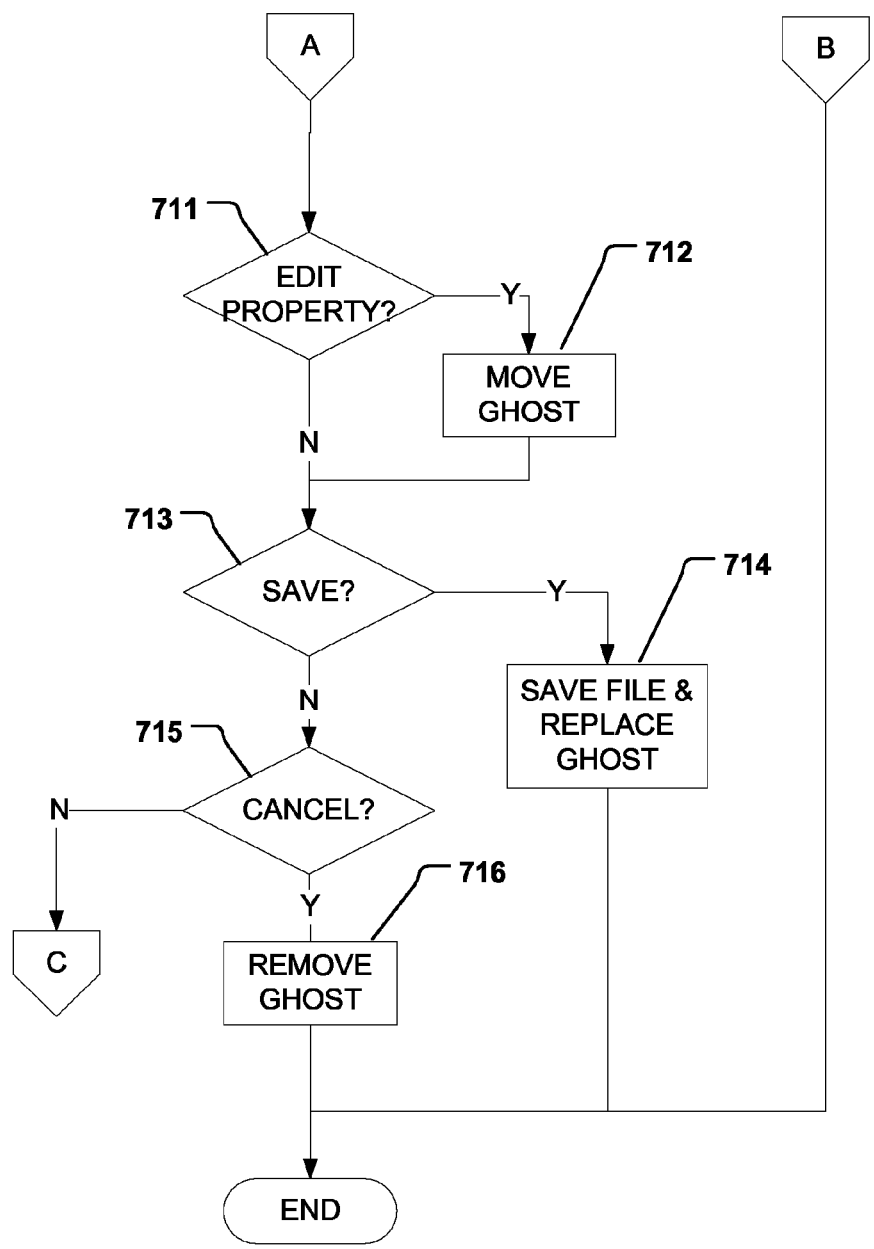

FIGS. 7A and 7B depict an example process that may occur when a file is to be created on a computing system. In step 701, the request to initiate the saving of a new file is received, and the ghost preview may be generated, as discussed above, to reflect how the current saved file would appear if the file were saved using the current metadata. The new file may be automatically populated with metadata by the application requesting the save. The display may also include a display of editable metadata, and may also include a preview thumbnail image of the file.

In step 702, the system may check to determine whether the user has changed the current view to cause the new file to conform to the properties of the new view. Changing the view may simply refer to navigating through a display space, or changing the criteria of a given display, and may be done by entering different criteria (e.g., requesting to view files of type *.wav) and/or GUI navigation (e.g., dragging and dropping the ghost into a new view, or just clicking on a folder indicia to enter the folder). For example, if the user requests to see a different view of files, such as files of a different type, a different location, a different project, etc., as discussed above, then the process may proceed to step 703 to determine whether the new view represents a valid save location (physical location or logical location) for the file. For example, the user might not have privileges for saving files to certain locations, or to certain views, or the file to be saved is incompatible with the other files in the new view (e.g., the user has changed views to a spreadsheet view, and the new file is an incompatible image file). As another example, ghosts from a common file dialog might be prohibited from being moved to a location outside of the dialog. Changing views does not necessarily always result in changing the new file's properties. In some instances, the user may have simply changed views to view different files, with no desire to update the properties of the new file to match those of the changed view. For example, the user may have simply wanted to see what other documents exist for a particular priority, without necessarily changing the priority of the file being saved. If no such updating of the properties is desired when the view is changed, the process may move from step 702 to step 706.

If the new location is invalid, the system may move to step 704 and take steps to alert the user that an invalid location has been selected. For example, the preview ghost may simply disappear from the view. Furthermore, a message may be provided to the user. If this occurs, the system may simply remain in this state until the user selects a different view representing a valid location for the file. Alternatively, the user may abort the process by, for example, pressing a Cancel button 608.

If the new view is a valid location, the system may move to step 705 and carry the change through. This may involve a step of relocating the preview ghost so that it appears in the new view. The file's metadata may also be automatically updated to reflect the metadata required (if any) of the newly-selected view. For example, if the user chooses a new view of all files in a given project, then the "Project" metadata property may be revised to reflect the new project.

In step 706, the system may check to determine whether the user has requested that the new file replace an existing file. This may be done by, for example, dragging and dropping the ghost preview indicia onto an indicia of an existing file. If this occurs, in step 707 measures may be taken to retain the original set of metadata properties, for example, by saving them to memory. The displayed metadata properties may be replaced by the properties of the file to be replaced, to reflect the fact that the new file will assume the same properties as the file it is replacing. Saving the original properties may be helpful should the user change his/her mind about the replacement. Of course, dragging-and-dropping onto an existing file is not always required, and in those instances where such functionality is not desired, step 706 may be skipped.

In step 708, the system may wait to see if the user executes the save process (for example, by pressing a Save button 607). If the user executes the save process, then the new file replaces the old in step 709. The previous properties retained in step 707 may be discarded.

If the user decides not to execute the replacement process, such as by selecting the ghost again, then the process may turn to step 710, in which the ghost may be displayed in its previous state. The original metadata properties saved in step 707 may be used to repopulate the metadata fields of the ghost preview. Alternatively, the new file may retain the properties of the file that was previously to be overwritten. This alternative may make it easy for users to duplicate an entire set of metadata properties without entering each one separately. For example, the properties of the item that was (but is no longer) to be replaced may be retained as a "stamp" or new default set of properties that may be applied in the future to new saved files.

In step 711, a check may be made to determine whether the user has edited a metadata property value using, for example, a metadata display area 606. If the user has edited the metadata, the system may automatically move the ghost preview in step 712 to a new location commensurate with the new property and, if necessary, update the appearance of the ghost preview to reflect the new metadata property (e.g., selecting a different indicia if the file type has changed, or revising the file name under the indicia).

In step 713, the system may check to determine whether the user has requested to execute the save, such as by pressing the Save button 607. If the user has requested the save operation, then the new file is saved in step 714, and the ghost preview is dismissed (the new file now appears as a normal indicia).

If the user has not yet finalized the save, a check may be made in step 715 to determine whether the user has aborted the save operation by, for example, pressing Cancel button 608. If the user has canceled the save operation, the ghost may be removed in step 716. The ghost's property data may also be deleted from the system.

Alternative embodiments and implementations of the present invention will become apparent to those skilled in the art to which it pertains upon review of the specification, including the drawing figures. For example, the various steps in the described processes may be rearranged, modified, and/or deleted as desired to implement a selected subset of features described herein. Additionally, in the above, references to certain features being found in one or more "aspects" or "embodiments" of "the present invention" are made simply to illustrate various concepts that may be advantageously used alone or in combination with other concepts, and should not be read to imply that there is only one inventive concept disclosed herein, or that all of the described features are required in any of the claims that follow. Rather, each of the following claims stands as its own distinct invention, and should not be read as having any limitations beyond those recited.

What is claimed is:

1. A method for saving files on a computer system, comprising the steps of:
    receiving a request to save a new file on a computer system;
    based on the request to save the new file, triggering a display of a system file panel for saving a file, said system file panel showing one or more indicia representing files that are already saved to a prospective location on the system and showing at least one preview indicia representing a file that is not saved to the prospective location on the system, wherein the at least one preview indicia and the one or more indicia representing files that are already saved to the prospective location on the system have different appearances in order to indicate the at least one preview indicia represents a file that has not yet been saved to the prospective location on the system;
    receiving a request to change one or more properties of the new file, wherein the one or more properties comprise metadata including file type;
    changing the at least one preview indicia to reflect the request to change the one or more properties of the new file; and
    changing the one or more properties of the new file if the new file is saved.

2. The method of claim 1, wherein said difference in appearance includes a difference in opacity.

3. The method of claim 1, wherein said system file panel displays a view of indicia for files that meet predetermined criteria associated with said view.

4. The method of claim 3, wherein said new file is provided with initial metadata values, and said preview indicia is displayed in a view whose criteria are satisfied by said initial metadata values.

5. The method of claim 4, further comprising the step of moving said preview indicia from said view to a different view, said different view having different criteria, and automatically revising said metadata to correspond with the different criteria of the different view.

6. The method of claim 4, further comprising the step of changing one or more of said metadata values in response to a user request, and automatically revising said preview indicia to reflect the change in metadata values.

7. The method of claim 6, wherein said revising of said preview indicia includes repositioning said indicia to a different view having criteria that are satisfied by the changed metadata values.

8. The method of claim 4, further comprising the step of receiving a user request to replace an existing file with said new file, revising said metadata values to reflect metadata values of said existing file, and retaining said initial metadata values.

9. The method of claim 8, further comprising the step of receiving a user request to abort said replacement, and reverting said revised metadata values back to said initial metadata values.

10. The method of claim 8, wherein said user request is entered by dragging said preview indicia and dropping said preview indicia onto an indicia representing said existing file.

11. The method of claim 4, wherein said initial metadata values are supplied by an application requesting said system file panel.

12. The method of claim 1, further comprising the step of removing said preview from said display in response to said user requesting a view representing an invalid location for saving said file.

13. The method of claim 12, wherein said location is a result of a query.

14. One or more computer-storage memory having computer-executable instructions for performing the following steps:
    receiving a request to save a new file on a computer system; and
    displaying a system file panel for saving a file, said system file panel including one or more indicia representing files that are already saved on the system, and at least one preview indicia representing a file that is not already saved on the system, wherein the at least one preview indicia is shown in a manner indicating how the corresponding file would appear when saved on the system relative to other files already saved on the system;
    displaying the at least one preview indicia with an appearance distinct from the one or more indicia to indicate the file has not yet been stored on the computer system;
    receiving a request to change one or more properties of the new file, wherein the one or more properties comprise metadata including user name;
    changing the at least one preview indicia to reflect the request to change one or more properties of the new file; and
    changing the one or more properties of the new file if the new file is saved.

15. The computer-storage memory of claim 14, further comprising computer-executable instructions for performing the following steps:
    including a plurality of views in said system file panel, each of said views having criteria and including indicia representing files meeting said criteria; and
    revising metadata for said new file in response to a user moving said preview indicia from a first view to a second view.

* * * * *